United States Patent
Yee et al.

(10) Patent No.: US 11,431,701 B2
(45) Date of Patent: Aug. 30, 2022

(54) COMPUTER-BASED SYSTEMS INVOLVING SHARING SESSION AUTHENTICATION AND/OR ACCOUNT DETAILS WITH A TRUSTED PARTY AND METHODS OF USE THEREOF

(71) Applicant: Capital One Services, LLC, McLean, VA (US)

(72) Inventors: Bryant Yee, McLean, VA (US); George Bergeron, McLean, VA (US); Mykhaylo Bulgakov, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/996,820

(22) Filed: Aug. 18, 2020

(65) Prior Publication Data

US 2022/0060469 A1    Feb. 24, 2022

(51) Int. Cl.
| | | |
|---|---|---|
| *G06F 15/16* | (2006.01) | |
| *G06F 7/04* | (2006.01) | |
| *H04L 9/40* | (2022.01) | |
| *H04L 67/141* | (2022.01) | |

(52) U.S. Cl.
CPC ........ *H04L 63/0838* (2013.01); *H04L 63/102* (2013.01); *H04L 63/105* (2013.01); *H04L 67/141* (2013.01)

(58) Field of Classification Search
CPC ....... H04L 63/00; H04L 63/20; H04L 63/083; H04L 63/0815; H04L 63/0861; H04L 63/1425; G06F 16/951; G06F 21/31; G06F 21/40; H04W 4/80
See application file for complete search history.

(56) References Cited

U.S. PATENT DOCUMENTS

| | | | |
|---|---|---|---|
| 8,832,788 B1 * | 9/2014 | Gibson | G06F 21/40 726/2 |
| 8,914,851 B2 | 12/2014 | Fakhrai et al. | |
| 9,578,025 B2 | 2/2017 | Pinski et al. | |

(Continued)

FOREIGN PATENT DOCUMENTS

| | | |
|---|---|---|
| CN | 201410441719 B | 9/2014 |
| JP | 01229539 A | 9/1989 |

*Primary Examiner* — Dustin Nguyen
(74) *Attorney, Agent, or Firm* — Greenberg Traurig, LLP

(57) ABSTRACT

Systems and methods associated with sharing encrypted account details with a trusted party are disclosed. In one embodiment, an exemplary method may comprise hosting an online service accessed by a plurality of user accounts each configured for concurrent access sessions, establishing a first authenticated access session for a first user account between the online service and a first device associated with a first user, receiving a login request associated with the first user account to establish a second authenticated access session between the online service and a second device associated with a second user, transmitting, to the first device, a notification of the login request including a GUI element and a request to authenticate the login request, and establishing the second authenticated access session between the online service and the second device of the second user based on authentication of the second user via the GUI element.

20 Claims, 12 Drawing Sheets

(56) References Cited

U.S. PATENT DOCUMENTS

| | | | |
|---|---|---|---|
| 2009/0217367 A1* | 8/2009 | Norman | H04L 63/0815 726/8 |
| 2015/0128240 A1* | 5/2015 | Richards | H04L 63/0861 726/7 |
| 2015/0351004 A1* | 12/2015 | Ko | H04W 4/80 455/411 |
| 2016/0006734 A1* | 1/2016 | Huang | G06F 21/31 726/4 |
| 2016/0140335 A1* | 5/2016 | Proulx | H04L 63/083 726/6 |
| 2016/0226864 A1 | 8/2016 | Fakhrai et al. | |
| 2016/0315954 A1* | 10/2016 | Peterson | H04L 63/1425 |
| 2017/0195429 A1* | 7/2017 | Bokare | H04L 63/00 |
| 2019/0158492 A1* | 5/2019 | Zavesky | G06F 16/951 |
| 2019/0222560 A1 | 7/2019 | Ford et al. | |
| 2020/0186518 A1* | 6/2020 | Shah | H04L 63/20 |

* cited by examiner

COMPUTER-BASED SYSTEMS INVOLVING SHARING SESSION AUTHENTICATION AND/OR ACCOUNT DETAILS WITH A TRUSTED PARTY AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to an improved computer-based platform or system, improved computing components and devices and/or improved computing methods configured for one or more novel technological applications involving sharing account information and/or details with a trusted entity.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or other software associated with data processing, online service software applications, and/or addressing shortcomings or failures of platforms and software applications in the online services field.

OVERVIEW OF DESCRIBED SUBJECT MATTER

In some embodiments, the present disclosure provides various exemplary technically improved computer-implemented methods for sharing account information and/or details with a trusted entity, including a method having steps such as:

hosting, by a server, at least one online service accessed by a plurality of users utilizing a plurality of user accounts, wherein each of the user accounts is configured for a plurality of concurrent authenticated access sessions by a plurality of devices;

establishing, by the server, a first authenticated access session, associated with a first user account, between the at least one online service and a first device associated with a first user based on an authentication of the first user;

receiving, by the server, a login request to establish, via the first user account, a second authenticated access session between the at least one online service and a second device associated with a second user, wherein the login request comprises a second device identification of the second device;

transmitting, by the server, a login request notification of the login request, to the first device, to request the first user associated with the first device to authenticate the login request of the second user, wherein the login request notification comprises the second device identification of the second device and a graphical user interface (GUI) element configured to allow the first user of the first device to authenticate the login request;

authenticating, by the server, the second user based on an interaction with the first user via the GUI element; and/or establishing, by the server, the second authenticated access session between the at least one online service and the second device associated with the second user based on the authentication of the second user.

In some embodiments, the present disclosure also provides exemplary technically improved computer-based systems and computer-readable media, including media implemented with and/or involving one or more software applications, whether resident on computer devices or platforms, provided for download via a server and/or executed in connection with at least one network such as via a web application, that include or involves features, functionality, computing components and/or steps consistent with any set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
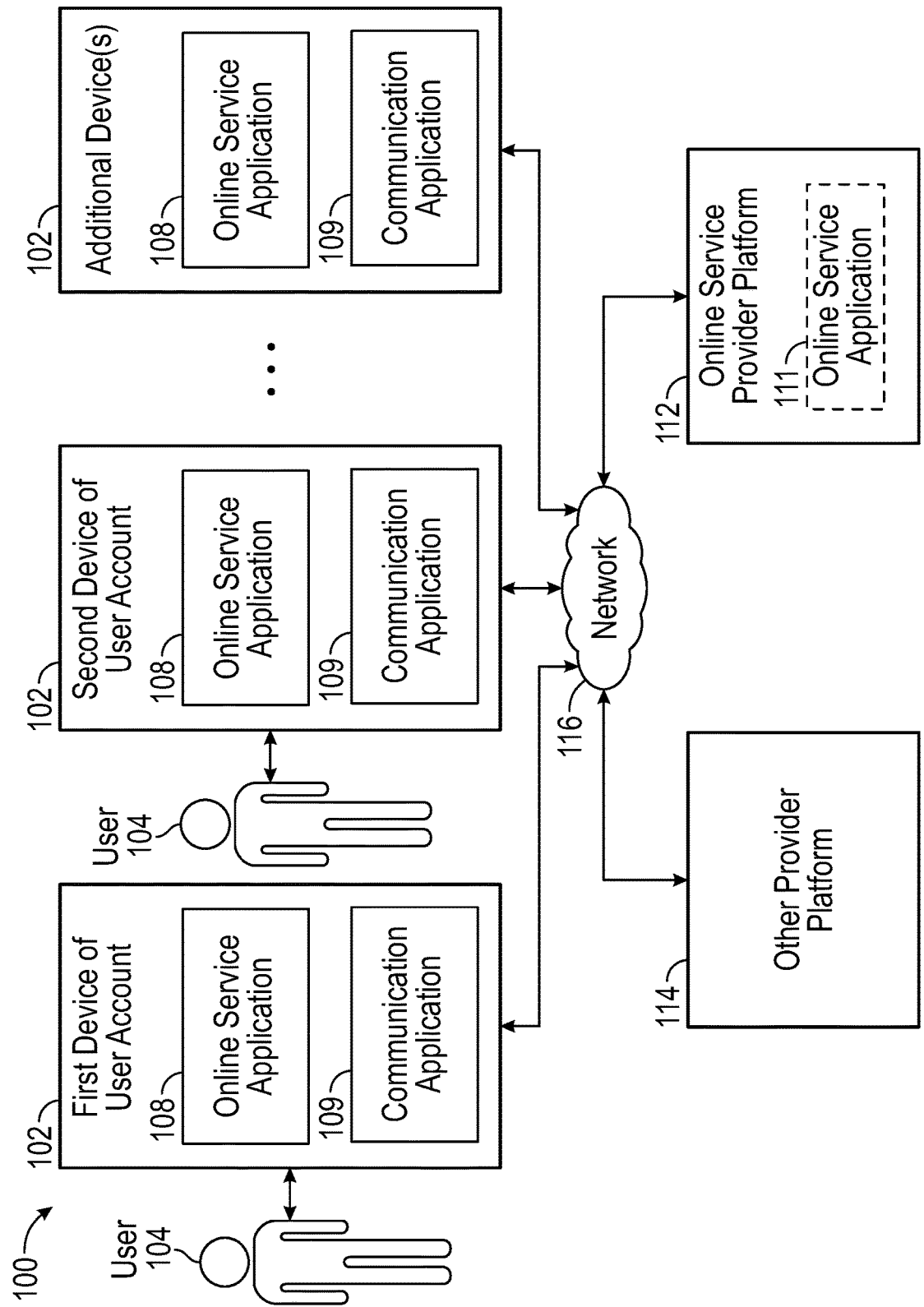
FIG. 1 is a block diagram of an exemplary system and/or platform involving features of online service software applications, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

Given the extent of software services that are hosted and accessed online, solutions enabling users of shared online accounts to access such accounts are needed in a variety of situations, such as when one user of a shared account forgets login passwords or other credentials. The disclosed technology enables a user to send a password sharing request to a trusty party (e.g., another user of their shared online account), and be authenticated to access the account based on the interaction, for example, by sharing the login credentials such as passwords or other account details between users in a secure manner. Implementations of sharing account details with a trusted party herein may comprises various steps such as hosting an online service accessed by a plurality of user accounts, receiving a login request to establish an authenticated access session, transmitting a login request notification and thereby authenticating an access session, and establishing the requested access session, as are set forth below. According to such features, by allowing a user to share account details with a trusted party, a provider may improve its service performance and productivities in various ways, such as decreasing system inaccessibility time, decreasing system access recovery time, increasing system service utilization, increasing system security and privacy related to customer accounts, improving customer satisfaction, improving customer loyalty, as well as increased profitability resulting therefrom. Various exemplary systems, processes and workflows that may be utilized to enable such account detail sharing functionality and benefits, consistent with embodiments herein, are set forth, below.

Further, aspects of the innovations herein may involve various technical solutions required for account detail sharing, such as technical solutions associated with aspects including but not limited to securely sharing login credentials across platforms and/or devices, hosting online service accounts configured for concurrent authenticated access sessions via different devices, authenticating access sessions including transmission of login request notification and associated user interaction with such notifications, as well as establishing the requested access session based on the authentication.

Turning to the basic workflow of an exemplary online service system or provider that wishes to enable a user to share account details with at trusted party, aspects herein may involve a secure sharing engine or process to invoke and handle a sharing request. As used herein, an account is defined as an establishment of a set of information with which a user is allowed to access a service and/or data provided at a service provider or data provider. Examples of such account may include, though are not limited to, an account with a financial service provider, an account with an e-commerce service provider, an account with a payment service provider, an account with a wireless service provider, an account with an email service, an account with a social network service, an account with an online-streaming service, an account with an online conference service, an account associated with an app, and so on. As used herein, "account details" are defined as the information pertaining to an account and/or usage of and/or activities incurred with an account. Examples of such account details may include, though are not limited to, username, account number, password (e.g., voice print, finger print, facial image, any biometric data), user profile, security questions, answers to security questions, recovery phone number, recovery emails, virtual account credentials, account activity history, social networking content tagged in relation to the account activities, and so on.

FIG. 1 is a block diagram of an exemplary computer system 100 involving features of sharing account details with a trusted party, consistent with the disclosed embodiments. System 100, which may take the form of a platform, may be configured for executing one or more software applications and account detail sharing processes consistent with the disclosed embodiments. As shown, system 100 may include one or more computing devices 102, such as a client computing device associated with a user 104. Computing device 102 may be configured to execute, among other programs, an online service application 108 and a communication application 109. Other applications, e.g., other than the example online service application 108 illustrated and described below, provided to the users may also utilize the disclosed technology. As set forth in the example embodiment shown, system 100 may further include an online service provider computer platform 112, such as an enterprise company platform, a merchant platform, or any other provider platform that hosts online services for users over a network with shared account details, and one or more other provider systems 114, such as databases, providers or entities associated with the service(s) being provided or the account-sharing technology disclosed. As shown, computing devices 102, online service provider platform 112, and other provider platform 114 may be communicatively coupled by a network 116. Various functionality and benefits of online service application 108 and communication application 109 may also be achieved via one or more modules, such as 111, within or associated with the online service provider platform 112. Here, for example, online service provider platform 112 may contain a server-side version of an online service application 111 affiliated with the client-side online service application 108 at the computing device 102. For simplicity of explanation, various communication and/or behavior of such computer systems and/or components (i.e., 108, 109 and 111) are generally discussed below by referring to operation of the online service application or system.

Other provider platform 114 may be one or more computing devices accessed in connection with providing the online service application 111, such as information or programs requested by the online service provider platform 112 over network 116. For example, files or data used by the online service application 111 may be stored in a database of other provider platform 114, and/or other information needed to perform sharing with a trusted party may be resident in one or more other provider platforms 114. In some embodiments, other provider platform 114 may be associated with a merchant that provides goods or services, other service providers, or other entities that provide online customer or user accounts. The disclosed embodiments are not limited to any particular configuration of other provider platform 114.

While only one of online service application 108, communication application 109, online service provider platform 112, other provider platform 114, and network 116 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. Computing device 102 may be one or more computing devices configured to perform operations consistent with executing online service application 108 and communication application 109. One illustrative computing device 102 is further described below in connection with FIG. 3.

Online service application 108 may be one or more software applications configured to perform operations consistent with hosting online accounts, establishing access sessions, providing authentication notification and/or interface as set forth herein, providing the services of the application, as well as obtaining and transmitting desired information between applications and users, and the like. Here, for example, online service application 108 may be configured to provide various information, such as account authentication information, associated with one or more accounts, and/or account activities related to the user 104. Such processing may occur by or with an online service application 108, locally, or the online service application 108 may transmit requests to and/or operate with one or more other software applications and/or computing components to obtain and transmit the desired information. Online service application 108 may also be hosted and/or operated, in whole or in part, by a system and/or server, such as an online service provider 112, described below in connection with FIG. 2. Online service application 108 is further described below in connection with the computing device 300 of FIG. 3.

Communication application 109 may be one or more software applications, modules, routines, subroutines and/or extensions configured to provide services for user 104 at client computing device 102. In some embodiments, communication application 109 may be integral with online service application 108. Communication application 109 may be configured to perform operations consistent with one or more account details sharing during an execution thereof on client computing device 102.

Online service provider platform 112 may be one or more computing devices configured to host one or more software applications consistent with providing one or more services to user 104. For example, online service provider platform 112 may provide online service application 108 at computing device 102 over network 116. In some embodiments, other provider platform 114 may also be hosting one or more software applications to provide services to user 104 at client computing device 102 over network 116. For example, the one or more software applications may involve various online services that enable access to secondary services or data which user 104 may utilize. In some embodiments, the online service provider 112 may be configured with an online service application 111 to manage and process access requests for the service(s) and/or application(s) provided. In other embodiments, online service application 111 may be configured remotely from online service provider platform 112. Further, in some embodiments, the online service application 111 may be configured at other provider platform 114. In other embodiments, service application 111 may be configured as an independent (e.g., third party) service that provides secure account detail sharing for subscribing users, and/or users who are customers to account-based services. In the latter scenarios, account-based services such as those offered by, e.g., other providers platform 114 may outsource the secure account detail sharing aspect of their services to independent providers, who may handle various account-based services (e.g., a congregated secure account sharing service for a user's various accounts such as content, e-commerce, streaming, financial, etc.).

Network 116 may be any type of network configured to provide communication between components of system 100. For example, network 116 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
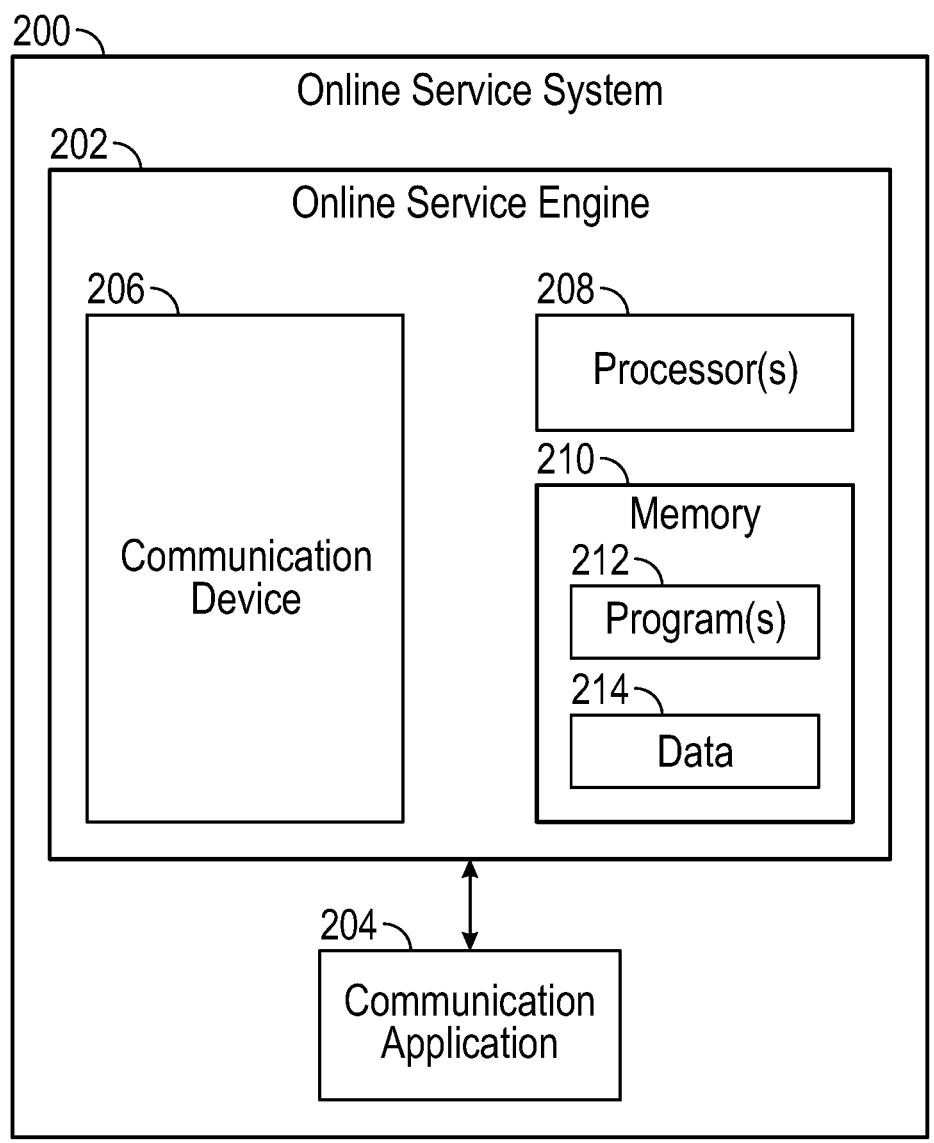
FIG. 2 is a block diagram of an exemplary system and/or platform involving features of sharing account details, consistent with exemplary aspects of certain embodiments of the present disclosure.

FIG. 2 is a block diagram of an exemplary online service system 200 that may correspond to or be associated with an online service provider 112, consistent with disclosed embodiments. As shown, online service system 200 may include online service engine 202, such as a server, and a communication application 204. Online service engine 202 may include a communication device 206, one or more processor(s) 208, and memory 210 including one or more programs 212 and data 214. Online service engine 202 may be configured to perform operations consistent with providing the online service application, which may be one of the programs 212, as well as associated account detail sharing functionality herein.

Online service engine 202 may take the form of a server, general purpose computer, mainframe computer, or any combination of these components. Other implementations consistent with disclosed embodiments are possible as well. Communication application 204 may take the form of one or more software applications stored on a computing device, such one or more software application stored in memory 210 or otherwise stored for access by an online service system 200 or the online service provider 112, described above.

Communication device 206 may be configured to communicate with one or more computing devices, such as user devices 102, or devices or databases associated with other provider systems 114, and the like. In some embodiments, communication device 206 may be configured to communicate with the computing device(s) through communication application 204. Online service engine 202 may, for example, be configured to provide instructions and/or operating information to communication application 204 through communication device 206. Communication device 206 may be configured to communicate other information as well.

Communication device 206 may be further configured to communicate with one or more systems associated with provide the online service and sharing account details with a trusted party, such as one or more additional online service providers 112, other provider systems 114, and the like. In some embodiments, such systems may operate or execute software applications being subject to online account management including sharing account details, and communication device 206 may be configured to communicate with such systems to generate, transmit and/or process account-detail sharing-related information or instructions regarding the subject services. Communication device 206 may be configured to communicate with such system(s) in other manners. Communication device 206 may be configured to communicate with other components as well.

Processor(s) 208 may include one or more known processing devices, such as a microprocessor from the Core™, Pentium™ or Xeon™ family manufactured by IntelR™, the Turion™ family manufactured by AMD™, the "Ax" (i.e., A6 or A8 processors) or "Sx" (i.e. S1, . . . processors) family manufactured by Apple™, or any of various processors manufactured by Sun Microsystems, for example. The disclosed embodiments are not limited to any type of processor(s) otherwise configured to meet the computing demands required of different components of online service system 200.

Memory 210 may include one or more storage devices configured to store instructions used by processor(s) 208 to perform functions related to disclosed embodiments. For example, memory 210 may be configured with one or more software instructions, such as program(s) 212, that may perform one or more operations when executed by processor(s) 208. Such operations may include managing account activities as well as creation and/or transmission of account-detail-sharing-related information. The disclosed embodiments are not limited to separate programs or computers configured to perform dedicated tasks. For example, memory 210 may include a single program 212 that performs the functions of online service system 200, or program(s) 212 may comprise multiple programs. Memory 210 may also store data 214 that is used by program(s) 212.

In certain embodiments, memory 210 may store one or more sets of instructions involved with carrying out the processes described below. Other instructions are possible as well. In general, instructions may be executed by processor(s) 208 to perform one or more processes consistent with disclosed embodiments. In some embodiments, program(s) 212 may include one or more subcomponents configured to generate and/or process instructions and information for use by communication application 204 the online service applications 108, 111 in performing account establishment, access session establishment, login request notification, access authentication, and other activities associated with providing account detail sharing services.

The components of online service system 200 may be implemented in hardware, software, or a combination of both hardware and software, as will be apparent to those skilled in the art. For example, although one or more components of online service system 200 may be implemented as computer processing instructions, all or a portion of the functionality of online service system 200 may be implemented instead in dedicated electronics hardware. In some embodiments, online service system 200 may also be communicatively connected to one or more database(s) (not shown). Alternatively, such database(s) may be located remotely from online service system 200. Online service system 200 may be communicatively connected to such database(s) through a network, such as network 116 described above. Such database(s) may include one or more memory devices that store information and are accessed and/or managed through online service system 200. By way of example, such database(s) may include Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data to the database(s).

Figure 3:
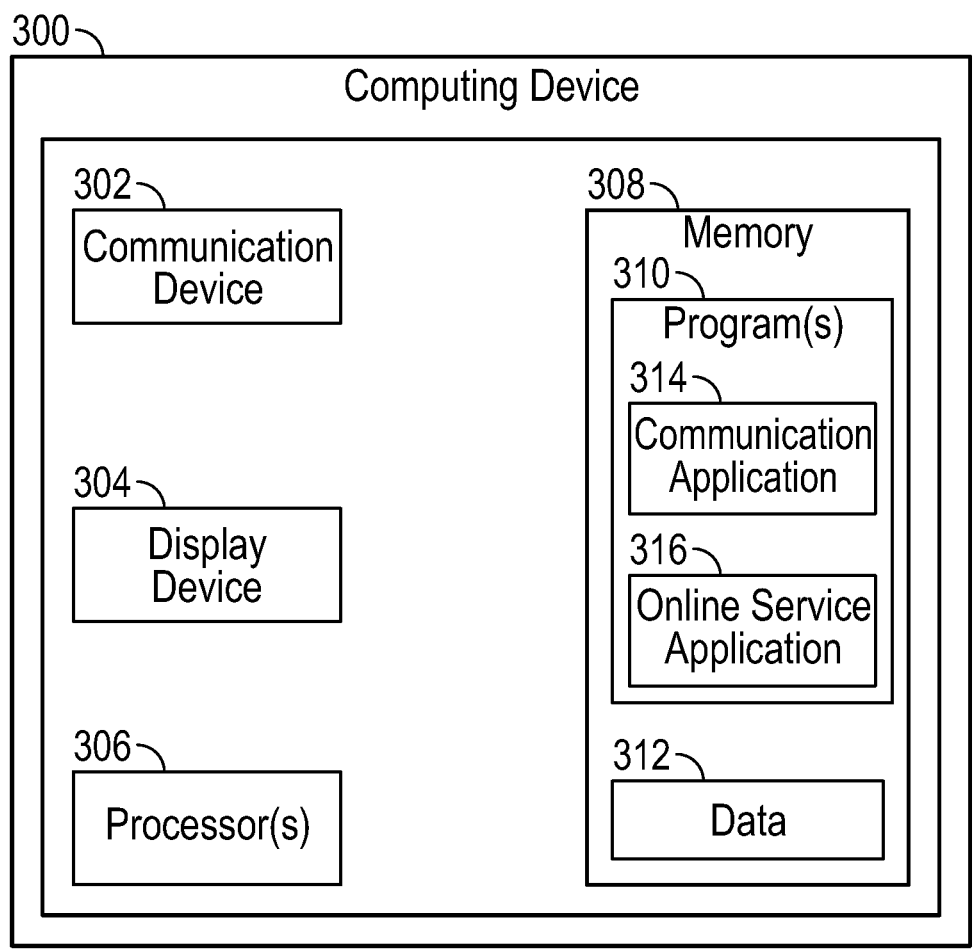
FIG. 3 is a block diagram of an exemplary computing device that may be associated with sharing account details, consistent with exemplary aspects of certain embodiments of the present disclosure.

FIG. 3 is a block diagram of an exemplary computing device 300, such as user device 102, consistent with disclosed embodiments. As shown, computing device 300 may include communication device 302, display device 304, processor(s) 306, and memory 308 including program(s) 310 and data 312. Program(s) 310 may include, among others, communication application 314 and online service application 316. In some embodiments, computing device 300 may take the form of a desktop or mobile computing device or IoT device, such as a desktop computer, laptop computer, smartphone, tablet, any combination of these components. Alternatively, computing device 300 may be configured as other fixed, portable, and/or mobile device, and/or wearable device, and/or any other device suitable for carrying on a user's person. Other implementations consistent with disclosed embodiments are possible as well. Computing device 300 may, for example, be the same as or similar to computing device 102 described above.

In the example embodiment shown, communication device 302 may be configured to communicate via one or more networks with the various computer systems and servers disclosed herein, such as online service provider 112. In some embodiments, communication device 302 may be further configured to communicate with one or more other providers, such as other provider platform 114 described above. Communication device 302 may be configured to communicate with other components as well. Communication device 302 may be configured to provide communication over a network, such as network 116 described above. To this end, communication device 302 may include, for example, one or more digital and/or analog devices that allow computing device 300 to communicate with and/or detect other components, such as a network controller and/or wireless adaptor for communicating over the Internet. Other implementations consistent with disclosed embodiments are possible as well.

Display device 304 may be any display device configured to display interfaces on computing device 300. The interfaces may be configured, e.g., for online service related information provided by computing device 300 via online service application 108. In some embodiments, display device 304 may include a screen for displaying a graphical and/or text-based user interface, including but not limited to, liquid crystal displays (LCD), light emitting diode (LED) screens, organic light emitting diode (OLED) screens, and other known display devices. In some embodiments, display device 304 may also include one or more digital and/or analog devices that allow a user to interact with computing device 300, such as a touch-sensitive area, keyboard, buttons, or microphones. Other display devices are possible as well. The disclosed embodiments are not limited to any type of display devices otherwise configured to display interfaces.

Processor(s) 306 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. The disclosed embodiments are not limited to any type of processor(s) otherwise configured to meet the computing demands required of different components of computing device 300.

Memory 308 may include one or more storage devices configured to store instructions used by processor(s) 306 to perform functions related to disclosed embodiments. For example, memory 308 may be configured with one or more software instructions, such as program(s) 310, that may perform one or more operations when executed by processor(s) 306. The disclosed embodiments are not limited to separate programs or computers configured to perform dedicated tasks. For example, memory 308 may include a single program 310 that performs the functions of computing device 300, or program(s) 310 may comprise multiple programs. Memory 308 may also store data 312 that is used by program(s) 310. In certain embodiments, memory 308 may store sets of instructions for carrying out some processes performed in connection with implementations described herein. Other instructions are possible as well. In general, instructions may be executed by processor(s) 306 to perform one or more processes consistent with disclosed embodiments.

In some embodiments, program(s) 310 may include a communication application 314. Communication application 314 may be executable by processor(s) 306 to perform operations including, for example, communicating information and/or performing other communications associated with the online service. Such communications may be processed by processor(s) 306 as well as displayed, for example, via display device 304. In some embodiments, such communications may be associated with systems, such as online service provider 112, other provider platform 114, and the like, described above. Communication application 314 may be executable by processor(s) 306 to perform other operations as well. In some embodiments, program(s) 310 may further include an online service application 316 which may implement aspects of secure account sharing, and otherwise provide web pages and execute programs, applications, and/or modules associated with the online service. This online service application 316 may, for example, be a program or module corresponding to the online service application 111 described above. Online service application 316 may be executable by processor(s) 306 to perform various operations including, for example, processing account login, establishing access sessions, obtaining contextual information (e.g., user information, login device information, login geo-location information, login network information, login time, etc.) pertaining to user logins and/or attempted logins, authenticating a trusted party which performs login, de-authenticating untrusted party that attempt login, etc., as described or associated with account detail sharing herein and/or accessed by computing device 300 via online service program 316. Other instructions are possible as well. In general, instructions may be executed by processor(s) 306 to perform one or more processes consistent with disclosed embodiments.

The components of computing device 300 may be implemented in hardware, software, or a combination of both hardware and software, as will be apparent to those skilled in the art. For example, although one or more components of computing device 300 may be implemented as computer processing instructions, all or a portion of the functionality of computing device 300 may be implemented instead in dedicated electronics hardware.

Figure 4A:
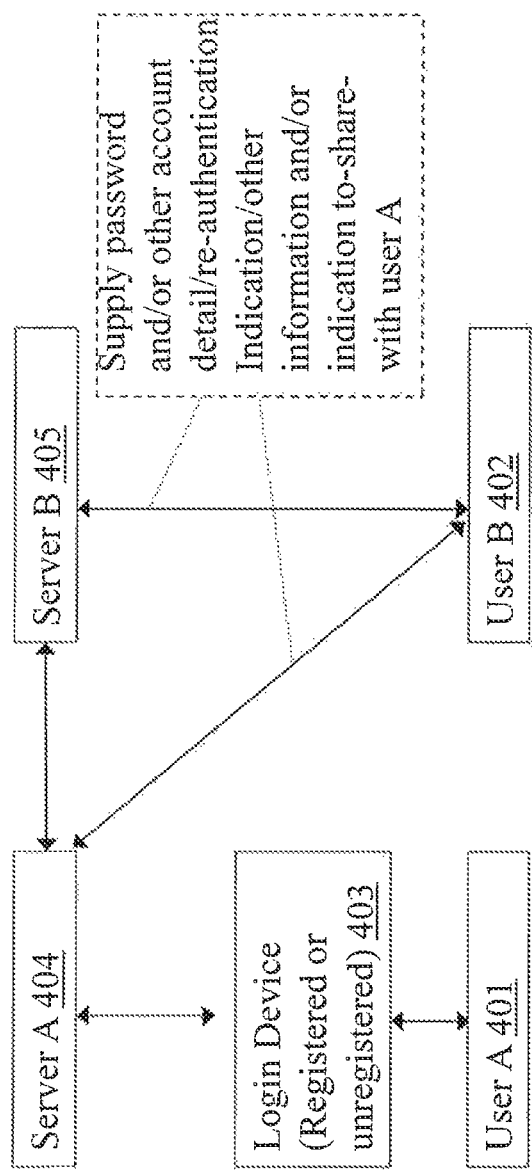
FIG. 4A is a block diagram illustrating plural users, servers and associated login aspects involved with sharing account details, consistent with exemplary aspects of certain embodiments of the present disclosure.

FIG. 4A is a block diagram illustrating an exemplary architecture for secure account detail sharing between a user and a trusted party, consistent with exemplary aspects of certain embodiments of the present disclosure. As shown in FIG. 4A, user A 401 attempts to access, at device 403, an online service hosted at server A 404 via logging into a user account associated with the online service. In some embodiments, device 403 may be a device that has not yet registered with server A 404 as being associated with the user account, for example, with its device identification. In some other embodiments, device 403 may be a device that is already registered with server A 404 as a registered device for authenticating access to the user account. In both cases, user A 401 may be prompted by server A 404 to enter various login credentials to for authentication. In connection with utilizing the technology herein, user A 401 has forgotten the password (and/or other pertinent account details) and cannot login to the user account by themselves, and thus user A 401 requests access to the account from user B 402, with whom user A 401 shares the user account, to access the online service. Upon notification that the access and/or credential sharing request is transmitted from a trusted party (e.g., user A 401), and the sharing is verified, user B 402 shares the password with user A 401, thereby allowing user A 401 to log into the user account. In one example embodiment, when logging in on a registered device, user A 401 only need only provide baseline login credentials such as a pair of username and password. According to other example embodiments, when logging in on an unregistered device, in addition to those credentials required, user A 401 may need to be further authenticated using security measures such as secondary authentication. In various examples, secondary authentication may include a set of security questions, dynamically generated information sent to another communication modality of users (e.g., SMS, email, etc.), and the like. In this example, user A's request to log into the user account at device 403 is not authenticated due to either the lack of the login credential (user A is aware that he or she does not know the correct password and/or username), or the incorrect login credentials received at server A 403 (e.g., incorrect username and/or password entered, failed secondary authentication).

In some embodiments, one such embodiment being illustrated in more detail below in connection with FIGS. 4B-4D, upon receipt of a share password request from user A 401 (e.g., via a GUI at user B's device), user B 402 verifies that the request comes from user A 401 and that it pertains to an account they share, user B 402 grants the request, and thereby shares the password or other login credential(s) with user A 401. Here, for example, in some embodiments, the software may be configured to cause the password to be auto-populated at a sign-in page of user A 401. Accordingly, despite a lack of entering correct login credentials and/or other authenticating information from user A 401 or upon user A 401 requesting such credentials or password from user B 402, the needed account details of the desired user account may be securely shared to user A 401 from user B 402, e.g., upon user B 402 indication that user A 401 is a trusted party with regard to accessing the user account. As shown herein FIG. 4A, user B 402 may communicate the required password, other account details (e.g., secondary authentication information), and/or other information relating to user A's login request directly to server A 403, or to server B 405, which in turn provides server A with the information supplied by user B 402. Here, as illustrated below in connection to FIGS. 4E-4H, instead of or in addition to providing a needed password, this other information may include additional information, which may even include data unrelated to the needed login information, such as recent activity the two users performed, and/or tasks or information related to what user A may wish to do, next, related to the shared account. Upon receiving the account detail securely shared from user B 402 in relation to user A 401's login request, server A 404 may proceed to authenticate user A 401 for accessing to the user account using the shared account information. In some embodiments, server A 404 and server B 405 are the same server.

Figure 4B:
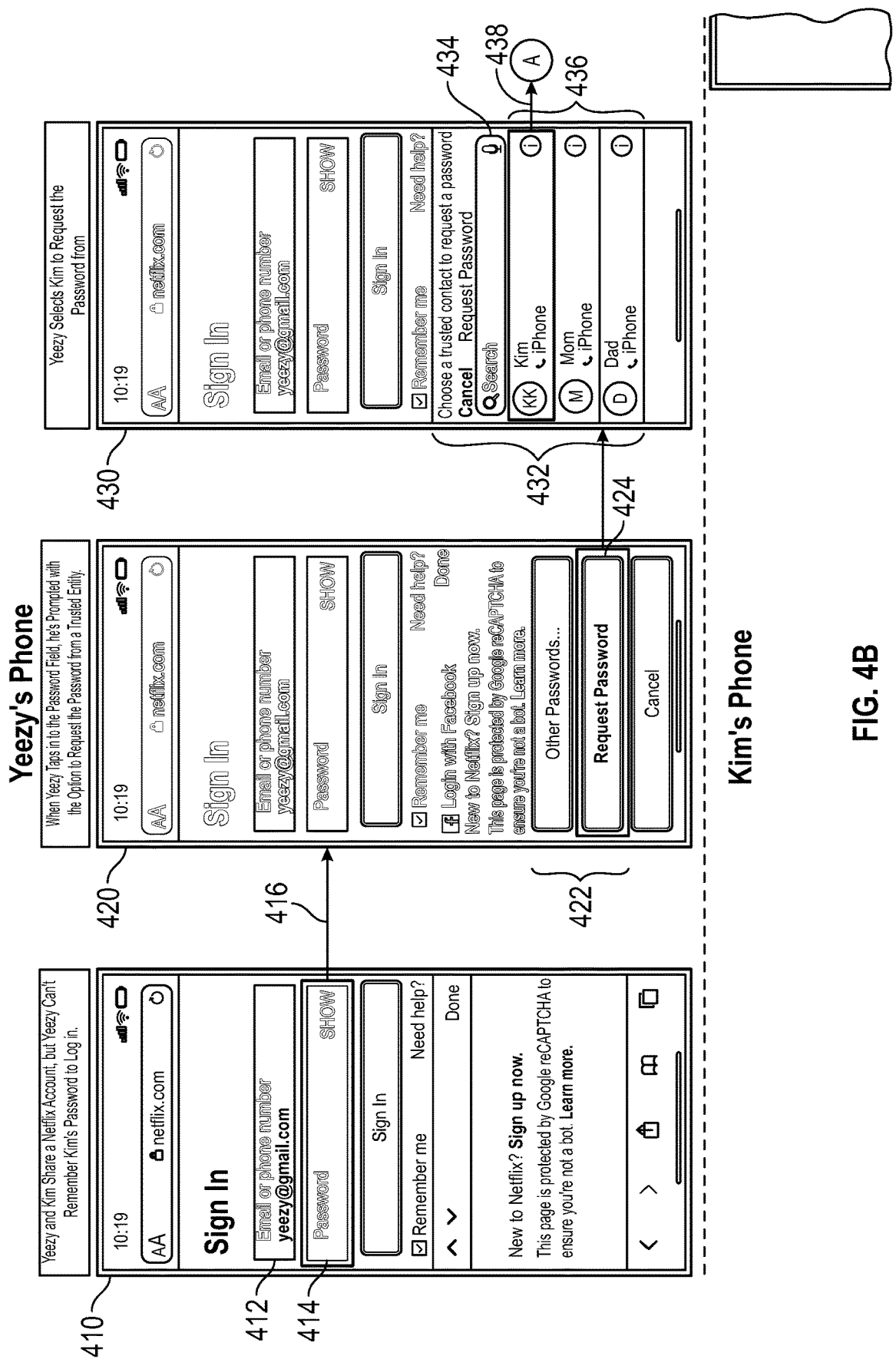
FIGS. 4B-4D illustrate a series of diagrams depicting exemplary user interfaces associated sharing account details, consistent with exemplary aspects of certain embodiments of the present disclosure.
Figure 4C:
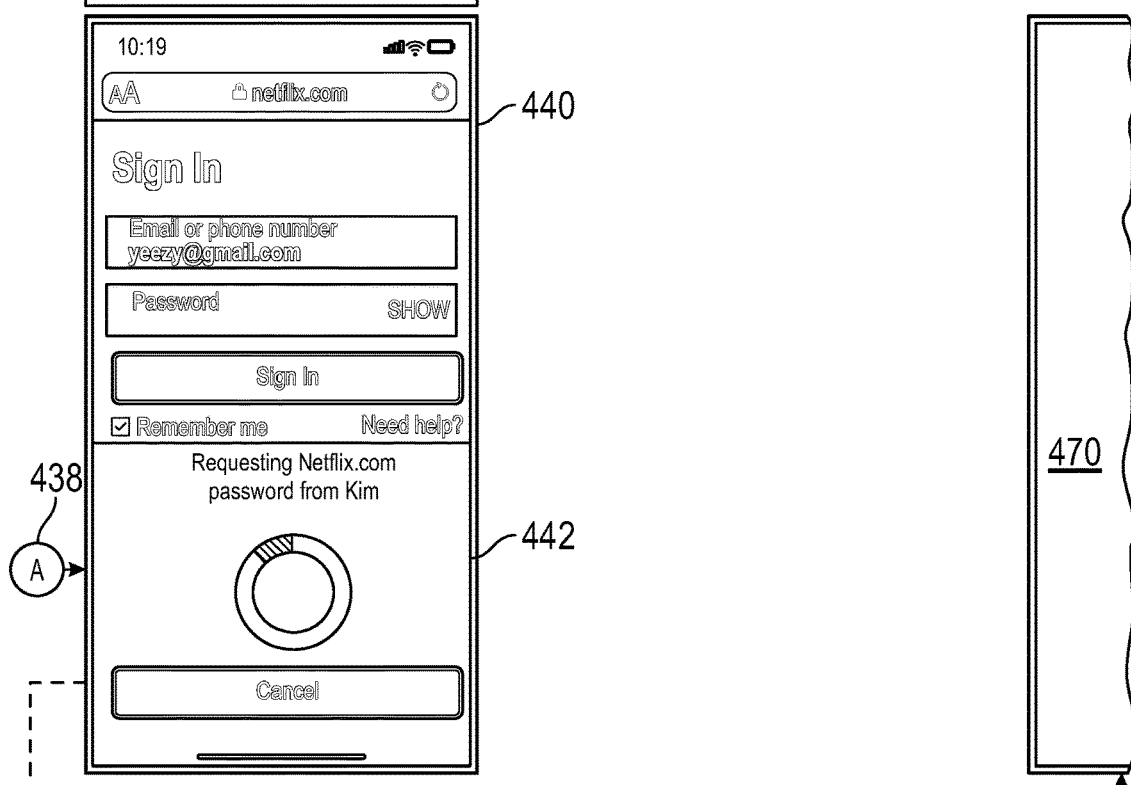
Figure 4C:
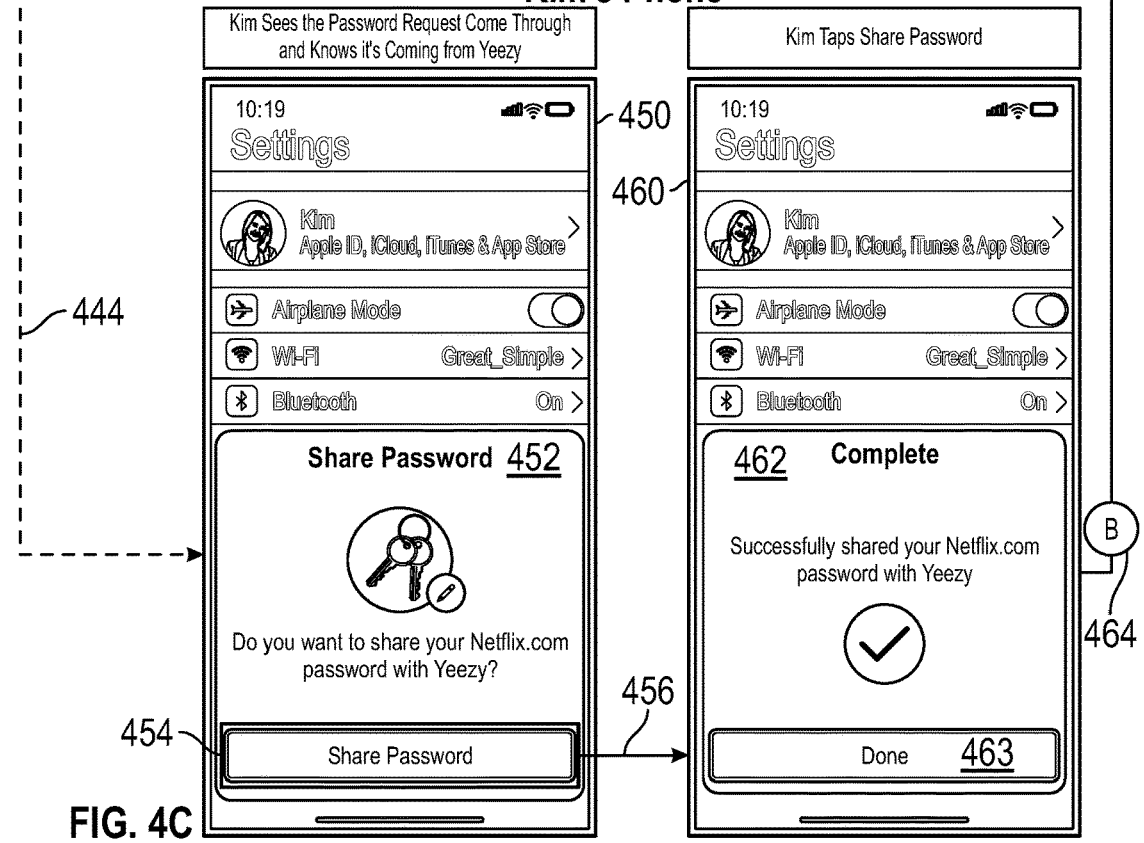
Figure 4D:
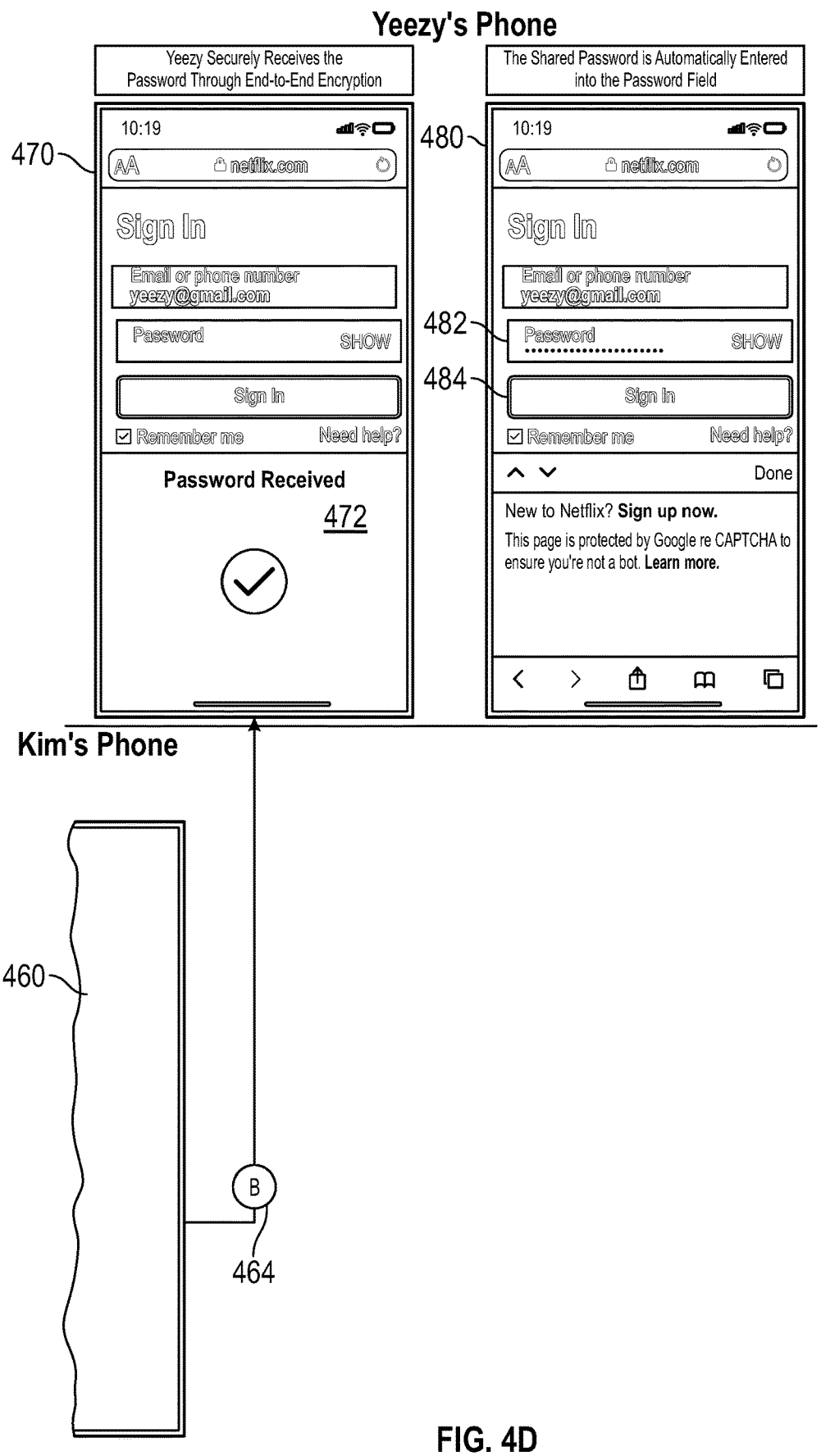

FIGS. 4B-4D are a series of diagrams illustrating exemplary user interfaces related to secure account detail sharing, consistent with exemplary aspects of certain embodiments of the present disclosure. FIG. 4B illustrates an exemplary user interface (UI) depicting that a first user, referred to as "Yeezy," navigates to a sign-in page of an online service (e.g., content provider, such as Netflix, other online service provider, etc.). In this example, Yeezy and a second user ("Kim") share a user account that they use to access the online service. In the first example user interface shown, a sign-in page 410 is displayed, including a first text field 412 and a second text field 414, with the sign-in page 410 prompting Yeezy to enter a username (e.g., an email address, a phone number) and a corresponding password, respectively, for authentication. The sign-in page 410 may also include a sign-in button used to submit the entered information to begin an authenticated session for Yeezy to access the online service.

In the example illustrated, Yeezy realizes that he does not know the password needed to access the user account. In this regard, the sign-in page 410 is provided with a GUI element 416, such as within the text field 414, that Yeezy may select or interact with (e.g., click, touch, swipe, double click, etc.) to navigate to a password assistance page 420, which may be a pop-up or window within an existing page. Upon selection of the GUI option 416 for such assistance, options related to assisting Yeezy to retrieve the password in order to access the user account are displayed on the password assistance page 420. Here, for example, several options may be displayed, e.g. in field 422, including options to use an "Other Password" and/or to "Request Password," etc., whereby the password assistance page 420 provides options that Yeezy may select to proceed with the login assistance. Upon Yeezy selecting the "Request Password" button in field 422, for example, the password assistance page 420 may be configured to navigate, at 424, to a password request page 430.

In the exemplary sequence shown in FIG. 4B, the password request page 430 displays one or more GUI elements with which Yeezy may interact to send a share-a-password request. As shown herein, an exemplary password request page 430 may include a lower portion 432 which displays a search box 434 and a scrollable list 436. In the example shown, the list 436 displays list of contacts from which the password to the user account may be requested. In some embodiments, the list 436 may be configured to display the communication modal associated with the each of the contacts. Here, for example, the three contacts displayed in the list 436 indicate that the password request associated with this user account may be sent to Kim's phone, Mom' phone, and/or Dad's phone. In other examples, the list 436 may include modals such as email, SMS, or the like. In some embodiments, the list 436 may be configured with GUI options allowing Yeezy to scroll up to down to select a contact. In other embodiments, the password assistance page 430 may allow Yeezy to enter information into the search box 434 to perform a search in all the contacts included in the list 436. In this example, Yeezy clicks on the entry of "Kim" with a phone icon to navigate, at 438, to a password request pending page 440 shown in FIG. 4C.

Turning to FIG. 4C, the password request pending page 440 may be configured to display a notification or field 442 indicating that the password is being requested from Kim. In the example shown, here, a progress indicator may be displayed to indicate the pending status of the submitted password request. In various embodiments, any suitable GUI element (e.g., wheel, a progress bar, a splash screen, etc.) may be utilized to inform the user of the status of the pending request at the password request pending page 440.

According to various embodiments, the password assistance page 420, password request page 430, the password request pending page 440 may be configured to retain portions of the GUI cues indicating that the user remains within the initial sign-in process. For example, the password assistance page 420, the password request page 430, and the password request pending page 440 may be configured to retain portions relating to the sign-in fields of the sign-in page 410 (e.g., on the upper area thereof as shown in FIG. 4B) in the background and/or otherwise in a non-active display or mode. In other embodiments, one or more of the password assistance page 420, password request page 430, the password request pending page 440 may be configured as separate screen, and/or otherwise without any indicia or GUI element(s) indicating the context of a sign-in process.

FIG. 4C illustrates a subset of user interfaces subsequent to Yeezy's submission of the password request at the password request page 420. Here, for example, Yeezy's device may remain at the password request pending page 440 after submitting the password request to Kim's phone, while transmitting a request to Kim's device, e.g., generating a share password page 452 and associated prompt(s) on Kim's device. In this example, the share password page 452 is configured as a push notification that is configured, e.g. within an app, browser page, or the like on Kim's device, to generate an active GUI 450 on a device owned by Kim, or one she is currently using. In various embodiments, the share password page 452 may be implemented using any suitable manner such as via an app, email, a text message, social media message, and the like. Here, for example, the share password page 452 may be configured to display an inquiry of whether Kim wants to share the Netflix account password with Yeezy. The share password page 452 may also include GUI elements allowing Kim to enter a positive or a negative response to the inquiry. As shown herein, upon verifying that the request is for the Netflix account and from Yeezy, Kim may select the "Share Password" button 454 to submit an approval of sharing the requested password with Yeezy. In some embodiments, the share password page 452 is configured to be active and displayed to Kim for a pre-configured period of time. As such, upon the lapse of the pre-configured requesting period of time, and without Kim's selection of the "Share Password" button 454, a negative response is sent to indicate a non-approval of Yeezy's password request.

In some embodiments, the share password page 452 may be configured with the knowledge and/or access to Kim's password to the Netflix account. For example, Kim may have already logged in the Netflix account at her phone and thereby stored the password in her device settings. In this case, Kim is already an authenticated user and the approval of Yeezy's password request may not include the password but instead an indication to impute an authenticated status to Yeezy's login request, e.g., since Yeezy is a trusted party. In other embodiments, the share password page 452 may be configured to prompt Kim to enter the password requested in a text field provided. In some other embodiments, the share password page 452 may be configured further prompt Kim to enter other account detail information (e.g., secondary authentication related information) in response to Yeezy's password request. According to various embodiments, regardless how the authenticated status is granted to Yeezy, the information shared from Kim to Yeezy may be encrypted.

In the example of FIGS. 4B-4D, Kim clicks on the "Share Password" button 454 to navigate 456 a share complete page 462, which may be shown as a pop-up atop another page, e.g., at 460. As shown herein, the share complete page 462 is configured to display a confirmation that "Successfully shared you Netflix password with Yeezy," as well as a check icon to indicate that the requested password is shared properly with Yeezy. The share complete page 462 may further display a "Done" button 463 to allow Kim to exit out of the pop-up page.

FIG. 4D illustrates a final series of the user interfaces associated with the password sharing request initiated by Yeezy beginning in FIG. 4B. Upon generation of the approval from Kim to share the requested credentials, at 464, the software application on Yeezy's device is configured to transition from the password request pending page 440 to a password received page 470. Referring to FIG. 4D, the illustrated password received page 470 may comprise a notification 472, such as the checkmark icon shown, displayed at the password received page 470 to inform Yeezy that Kim has accepted the request to share the password. Subsequently, the device may be configured to navigate back to a sign-in page, at 480. Here, then, the received encrypted password is decrypted and auto-populated into the password field 482. With the missing password populated, Yeezy may then select the sign-in button 484 to log into the online account. In some embodiments, the password received page 470 may be configured to disable the "show" icon which normally allows a user to view the password such that Yeezy is only able to establish an authenticated login session with Kim's shared password auto-filled at the sign-in page 480, without the password being visibly displayed to him.

In some scenarios, such as when the requesting device is not registered with the online account, the login process may further require a secondary authentication in addition to the receipt of the shared password. Further, the share password page 452 may be further configured to prompt Kim for such second-factor information, in addition to or instead of Yeezy, when detecting that the password request is not associated with a device ID registered with the user account. Further, when the other account details are shared between parties (beyond just password), these may also be shared securely or via encryption using such second-factor authentication.

Figure 4E:
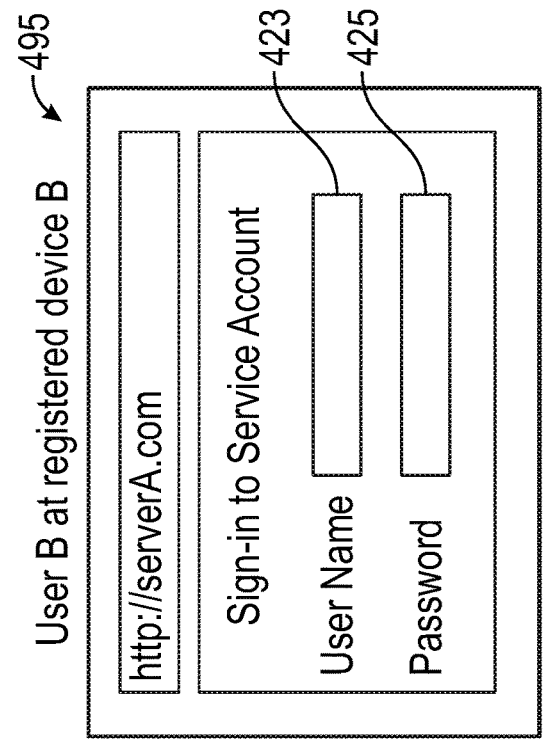
FIGS. 4E-4H illustrate other diagrams depicting exemplary user interfaces associated with sharing account details, consistent with exemplary aspects of certain embodiments of the present disclosure.

FIGS. 4E-4H illustrate additional exemplary user interfaces for secure account detail sharing, consistent with exemplary aspects of certain embodiments of the present disclosure. As shown in FIG. 4E, a simplified exemplary user interface 490 is provided where user A logs onto server A to access a user account, e.g., via device A. Various embodiments herein may be configured such that server A is configured to host at least one online service accessed by a plurality of users via a plurality of user accounts. Here, the user accounts are configured for a plurality of concurrent authenticated access sessions by a plurality of devices. In this example, user A and user B share the user account, where server A allows for concurrent login sessions by both user A and user B, at their respective devices. In some embodiments, device A may not be established as a registered device associated with the user account. For instance, user A might be a spouse who is using another computer or device (e.g., device A) to access the user account, such as when they are out of the house or when a primary device (e.g., device B) typically used to login to the shared account is unavailable. Referring to FIG. 4E, implementations may be triggered when user A fails to enter the correct login credentials, such as username in text box 492 and/or password at a password text box 494. Upon failure to enter correct credentials, user A is not authenticated for logging into server A at device A, and one or more aspects of the disclosed technology are implemented. According to other embodiments, device A may also be a registered device.

In connection with the implementations of secure account detail sharing herein, various contextual information (e.g., device data, IP address, geo-location, time zone, etc.) related to the attempted login at device A is detected by server A, and the online service application may handle such data and/or perform different processing based on certain data that may be different from information associated with previous authenticated login sessions.

In some embodiments, upon detection of user A's failed or incomplete login attempt, server A may, itself, be configured to initiate a secure account sharing process to determine when to allow and/or how to authenticate, user A's login request to access the user account via device A. In some embodiments, the online service application may perform the secure account sharing process, and may be configured to perform such processing at one or both the client side and/or the server side. In other embodiments, the online service application and/or server A may be configured to request a third-party account service provider to perform various secure account sharing functionality, and notify server A with the relevant details or the authentication status resulting from such third-party processing. In the following example, the secure account sharing is illustrated in connection with an embodiment where server A implements the sharing process.

According to various embodiments, a login request notification may be transmitted, e.g. via server A, from user A to user B, to authenticate the login request. Here, the login request notification may be configured for transmission by various electronic means, such as email, text, app or other push notification, or the like. Further, some embodiments may require user B to establish an authenticated login session for authenticating or otherwise responding to the login request. Here, for example, user B may be prompted via server A, responsive to the notification, to login the user account (e.g., to click on a link to navigate to a login web page, other complete action for app, etc.). Further, in embodiments herein, online service application may be configured to enable user B to securely receive, process, and transmit secure account sharing data, wherein, e.g., server A may receive and transmit the notification to a registered device, e.g., SMS to a registered phone number of user B at a device other than device B. In the latter case, server A may be configured to provide, e.g., via a suitable GUI or other elements in the notification, a request to solicit an authorizing response from user B. Here, for example, an SMS-based notification may be generated and configured such that user B may reply 'yes' to authenticate user A's login, or 'no' to block the attempted login request.

Figure 4F:
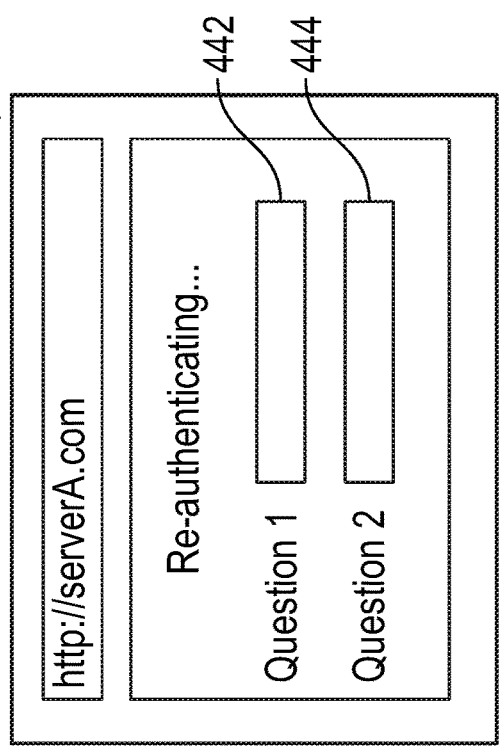

FIG. 4F illustrates an embodiment where user B logs into server A at an exemplary user interface 495. In some embodiments, user B may be prompted with such interface upon determination that user A failed to successfully login to the shared user account, e.g., using the entered user name and/or password, at the first user interface 490. In some embodiments, user B is notified at a device, device B, used to login the same account that user A is attempting to access. In other words, device B may be a registered device that is associated with the user account that user A and user B share. In some embodiments, user B may receive a login request notification at any device that is registered with the online service application for the purpose of account security (e.g., if user B normally uses one device to access the user account, user B may have another device, number, account, smart phone, or the like associated with the shared online account, such as for security purposes). According to some embodiments, when device B is a trusted/registered device from the perspective of the online service application or respective server or system, user B may be provided with a notification directly without being required to login server A.

In some embodiments, user B may initiate access to the user interface 495, e.g., upon an interaction by user A with user interface 490 failing to successfully login to server A. Here, for example, as shown in FIG. 4F, user B enters user name at a user name text box 423 and a password in a password text box 425 to be authenticated to login to server A.

Figure 4G:
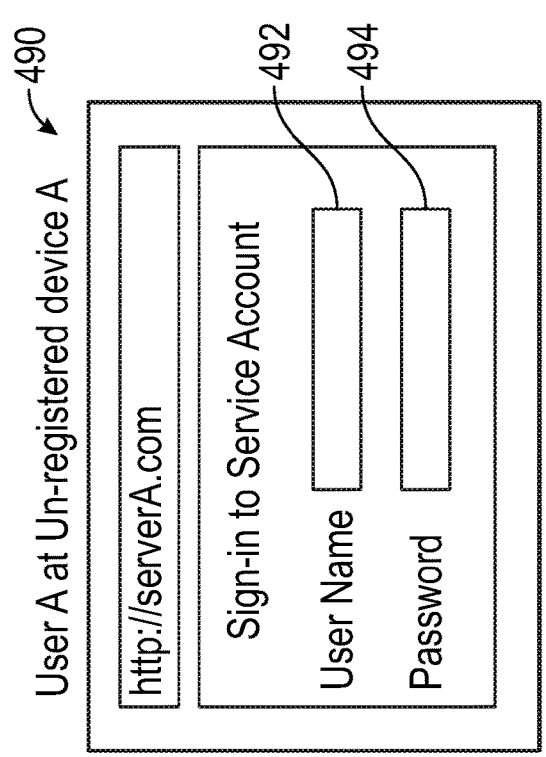

Upon login, a confirming user interface 496 may be displayed to user B, as shown in FIG. 4G, depicting a one or more GUI elements responsive to the login request notification from user A. Referring to FIG. 4G, user B may be prompted with GUI elements, such as a yes button 433 and a no button 435, with which user B may interact to authenticate user A's login at device A. Here, for example, upon user B's selection of an acceptance, such as a yes button 432, the online service application may authenticate the request, e.g., via server A, and thereby allow user A to access the online service without requiring user A to enter the normally-required login credentials. Alternately, upon selection of a 'no' GUI element 434 by user B, user A's login request is not authenticated. In some embodiments, device A at which user A is attempting the login may be classified as a non-authenticated or non-registerable device for security measures.

Further, according to various embodiments, the online service application may be configured to obtain contextual information regarding user A's login request and include such information and analysis thereof in the notification. In turn, user B may be able to determine that the login attempted at the unregistered device A is performed by a trusted party. In one example, the online service application may detect that user A is attempting to login the shared user account from device A, which may be a new device having a device identification not registered with the user account, but the IP address indicates that device A is connecting to server A from an address associated with the user account. In some embodiments, user B may be contacted by user A (e.g., via app, phone call, a text message, etc.) noting that user A is attempting to login the user account from a new location and/or from a new device. In other embodiments, server A may be configured to include in the notification that in user A's login request, a geo-location or IP address matches with the information recorded from previous login session, even though the login is attempted via a device other than the registered device(s). Here, for example, the online service application may be configured to notify user B that the attempted login is performed at device A from a recognized location (e.g., home address).

In other embodiments, device A by which user A is attempting login has installed thereon other applications which may be configured to communicate, with or via server A, to obtain user information such as user A's phone number, messaging activities, social networking account activities. For example, server A may be configured to query/obtain information about a user's activities at device A to determine that the requesting user is indeed user A and not an unauthorized (guest, child, etc.) user of the device, e.g., based on use of the device such as usage of apps, social media, call logs, etc. With such user/contextual authenticating information gathered on device A, the online service application may be configured to present the information to user B such that user B is able to determine or confirm (e.g., via 2FA) that user A is indeed a trusted party.

According to various embodiments, the online service application may be configured to authenticate user A's login request based on user B's interaction with the notification. In some embodiments, once user B indicate that user A is a trusted party, the online service application automatically imputes an authenticated status to user A's request, i.e., at device A, without any other security procedures needed (e.g., without requiring user A to login, etc.). In other embodiments, user B may indicate that user A is a trusted party but needs secondary authentication before the login request is granted. In such cases, user interface 496 may further provides a GUI element that allows user B to request re-authentication for user A, for example, based on secondary authentication, instead of automatically authenticating user A's login attempt. In other embodiments, user interface 496 may be further configured to provide a text box 437 to allow user B to share information of other account details, and/or other information, with user A. In some embodiments, user B may be one of the shared account holders who is sharing login credentials or information with user A. In other embodiments, user B may be an entity who has access to the user account, for example, the person who last logged into the user account according to an account activity record at server A. In some embodiments, information entered via text box 436 may be encrypted for transmission to user A.

In some embodiments, other measures may be provided to user B to facilitate secure sharing of account details with user A. For example, the notification may include a GUI input enabling user B to indicate a duration or expiration time regarding how long user A should be authenticated. In the case where user B indicates that user A needs to re-authenticated at some point, the re-authentication session may be configured to expire after a pre-determined period of time. In another example, the notification may provide user B with options to limit the access right(s) afforded to user A. Here, for example, user A may be authenticated as essentially user B; or as a guest user of the account, e.g., where information such as profile/preference/viewing history is not accessible for such session; or as user with one login session permitted, or as a user with customized access rights at the user account (where, e.g., the notification further allows user B to customize such access rights). In some embodiments, once user B decides user A is not a trusted party, the online service application is configured to deny user A's login request, and/or blacklist device A and/or contextual information relating to the login request.

Figure 4H:
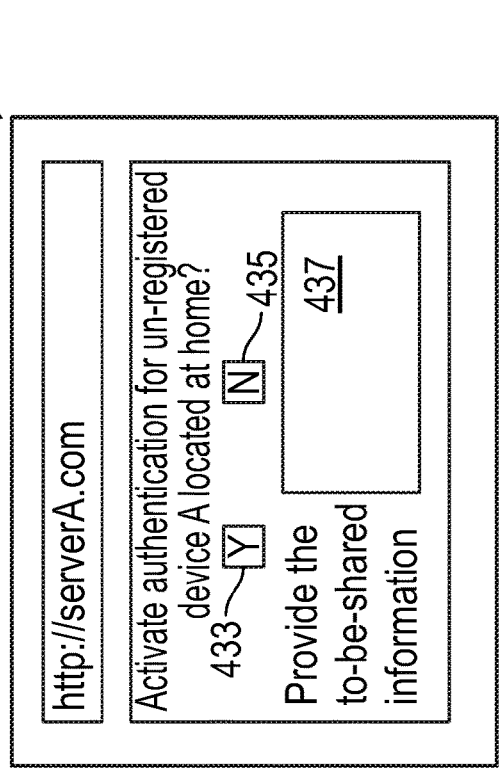

FIG. 4H illustrates one such embodiment where, upon user B confirming that user A's login at device A is trusted, user A is provided with an exemplary user interface 498 to re-authenticate with server A. Here, for example, as shown in FIG. 4H, herein, at this point user A may be prompted with one or more re-authentication questions, e.g., instead of with the traditional login credentials (e.g., username/password) that they would still not recall. Upon entering the correct answers to the re-authentication question(s) or second-factor authentication, user A is authenticated and then logged into server A, i.e., without need to provide the forgotten login credentials. As described above, in some embodiments, user A may be automatically authenticated to access server A without going through any secondary authentication measures, such as when user B imputes an authenticated status to user A as a trusted party via submissions and/or other GUI entry via the user interface 496.

In some embodiments, security questions for the user being authenticated may be configured with heightened sensitivity. In some embodiments, such security questions may be configured as dynamic questions related to the specific account activities incurred by the user account. For example, the security question may be configured to inquire about what was streamed the last time the account was accessed, at what time, what happened in that streamed show, as well as action, activities (such as tweets, etc.) after the user accessed the service, viewed the show, and the like.

According to certain embodiments herein, such as when an online service application is configured to request a third-party provider to perform one or more aspects of the account sharing process, such third-party provider may be configured with access and contextual information from various accounts associated with the relevant users, the subject service(s), and/or other account information included in the profile(s) accessible to the third-party provider. In this case, information from differing accounts or services may be used to generate secure, dynamic security questions. Here, for example, such security questions may request answers related to specific user information, such as mortgage information, car payment information, birthday information, travel plans, etc., when second-factor authentication is needed or when user A is re-authenticated for an online streaming service account. By way of example, here, when user A is re-authenticated for a financial service account, the dynamic security questions may inquire about the latest streaming activities, or other dissimilar account associated with that user.

Figure 5:
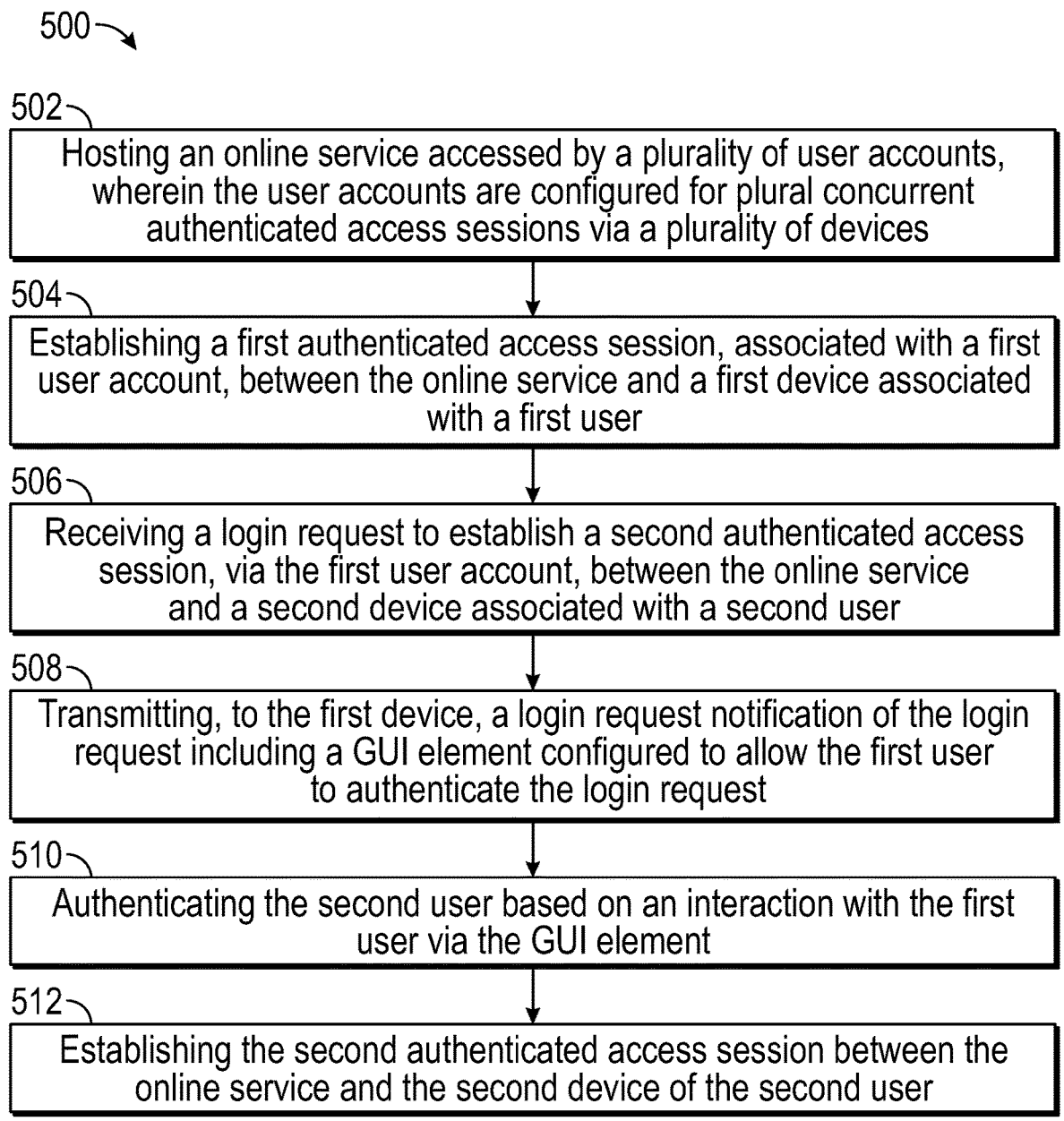
FIG. 5 is a flowchart illustrating exemplary processes related to sharing account details, consistent with exemplary aspects of certain embodiments of the present disclosure.

FIG. 5 is a flowchart illustrating exemplary processes related to account detail sharing, consistent with exemplary aspects of certain embodiments of the present disclosure. As shown in the exemplary flowchart of FIG. 5, an illustrative account detail sharing process 500 may comprise: hosting at least one online service accessed by a plurality of user accounts, wherein the user accounts are configured for a plurality of concurrent authenticated access sessions via different devices, at 502; establishing a first authenticated access session, associated with a first user account, between the at least one online service and a first device associated with a first user, at 504; receiving a login request to establish, via the first user account, a second authenticated access session between the at least one online service and a second device associated with a second user, at 506; transmitting, to the first device, a login request notification of the login request including a graphical user interface (GUI) element to allow the first user to authenticate the login request, at 508; authenticating the second user based on an interaction of the first user with the GUI element, at 510; and establishing the second authenticated access session between the at least one online service and the second device of the second user, at 512.

In some embodiments, account detail sharing process 500 may include, at 502, a step of hosting at least one online service accessed by a plurality of user accounts, each of the user accounts configured for a plurality of concurrent authenticated access sessions via different devices. With regard to the disclosed innovations, such plurality of user accounts may be utilized by a plurality of users. Further, the at least one service may be hosted via a server, such as one associated with one or more other provider platforms 114. In some example embodiments, such other provider platform 114 may comprise a financial service provider (FSP) system, which may comprise one or more servers and/or processors associated with a financial service entity that provides, maintains, manages, or otherwise offers financial services. Such financial service entity may include a bank, credit card issuer, or any other type of financial service entity that generates, provides, manages, and/or maintains financial service accounts for one or more customers, and thereby is a trusted entity that may facilitate sharing of secure account details.

The account detail sharing process 500 may include, at 504, a step of establishing a first authenticated access session, associated with a first user account, between the at least one online service and a first device associated with a first user. Further, according to various disclosed embodiments, the first authentication session may be established based on an authentication of the first user. In one embodiment, the first authentication session may be established by the server.

The account detail sharing process 500 may include, at 506, a step of receiving a login request to establish a second authenticated access session, associated with the first user account, between the at least one online service and a second device associated with a second user. According to various disclosed embodiments, the second authenticated access session may be requested to be established via the first user account. In some embodiments, the login request may comprise a second device identification of the second device. In one embodiment, the login request may be received at the server.

The account detail sharing process 500 may include, at 508, a step of transmitting, to the first device, a login request notification of the login request including a graphical user interface (GUI) element and a request to authenticate the login request. An illustration of the GUI is shown and discussed in connection with FIGS. 4C and 4F, above. Here, for example, various embodiments may be configured such that the login request notification may request the first user associated with the first device to authenticate the login request of the second user. In one example, the login request notification may request the first user associated with the first device to authenticate the login request of the second user, via the request to authenticate the login request. In some embodiments, such login request notification may comprise the second device identification of the second device. In other embodiments, the graphical user interface (GUI) element may be configured to allow the first user of the first device to authenticate the login request. Further, in some embodiments, the second device identification may not be registered with the first user account. In one embodiment, step 508 may be performed at the server.

According to some embodiments herein, the login request notification may be configured such that it may be generated and/or transmitted via the at least one online service application. In some other embodiments, the login request notification may be transmitted upon submission, by a user of the second device, of improper login credentials, such as one or both of: an incorrect username; and/or an incorrect password.

The account detail sharing process 500 may include, at 510, a step of authenticating the second user based on an interaction of the first user with the GUI element. According to various embodiments, the interaction of the user with the GUI element may be implemented as an interaction with the first user via the GUI element. In one embodiment, step 510 may be performed by the server. In some other embodiments, a selection/operation of the GUI element to authorize the login request may include providing verification, by the user of the first device, that the second device is associated with a trusted entity.

The account detail sharing process 500 may also include, at 512, a step of establishing the second authenticated access session between the at least one online service and the second device of the second user. Further, according to various disclosed embodiments, the second authenticated access session between the at least one online service and the second device associated with the second user may be established based on the authentication of the second user. In one embodiment, step 512 may be performed by the server.

Further, in some embodiment, the access to the first user account and the at least one online service, by the second device, may be conditioned upon continued login of the first device with the first user account. In other embodiments, upon ending a login session of the first device with the first user account, the first device may be provided with a GUI option to continue allowing the second device access to the first user account, or to terminate access.

According to some embodiments, methods herein may also comprise transmitting information to associate login credentials of the user of the first device with the second authenticated login session of the second device. In some implementations, such information may be transmitted upon authorization of the login request via the GUI element. Here, for example, the login credentials may comprise a one-time login credential for use in connection with authenticating the login request only. In one embodiment, such information may be transmitted by the server.

Further, according to some other embodiments, methods herein may also comprise making a determination that the first device is trusted prior to enabling authorization of the login request by the first device. Here, for example, the determination may include assessing a quantity of times that the first user device has been used to successfully log into the first user account to access the at least one online service.

According to some embodiments, methods herein may also comprise registering a first device identification for the first device with the first user account. In one embodiment, the server may be configured to register a first device identification for the first device with the first user account.

Further, with regard to the disclosed innovations, an illustrative account detail sharing process may comprise: hosting at least one online service accessed by a plurality of users utilizing a plurality of user accounts, wherein each of the user accounts is configured for a plurality of concurrent authenticated access sessions by a plurality of devices; establishing a first authenticated access session, via a first user account, between the at least one online service and a first device associated with a first user based on an authentication of the first user; registering, a first device identification for the first device with the first user account; receiving, during or after the first authenticated access session, a login request to establish, via the first user account, a second authenticated access session between the at least one online service and a second device associated with a second user; transmitting, a login request notification of the login request, to the first device, to request the first user associated with the first device to authenticate the login request of the second user, wherein the login request notification comprises the second device identification of the second device and a graphical user interface (GUI) element configured to allow the first user of the first device to authenticate the login request; authenticating the second user based on an interaction with the first user via the GUI element; registering after the authenticating the second user, the second device identification for the second device with the first user account; and establishing the second authenticated access session between the at least one online service and the second device associated with the second user based on a registration of the second device identification of the second device with the first user account.

According to some embodiments, the login request may comprise a second device identification of the second device. In other embodiments, the second device identification may not be registered with the first user account. In some embodiments, a selection/operation of the GUI element to authorize the login request may include providing verification, by the user of the first device, that the second device is associated with a trusted entity.

In some embodiments, the login request notification may be transmitted upon submission, by a user of the second device, of one or both an incorrect username and an incorrect password. Here, for example, the login request notification may be transmitted, via the server, to the first device, advising the user of the first device that another user is attempting to log into the first user account.

According to other embodiments, the account detail sharing process may further comprise: upon authorization of the login request via the GUI element, transmitting, by the server, information to associate login credentials of the user of the first device with the second authenticated login session of the second device. In some implementations, the login credentials may comprise a one-time login credential for use in connection with authenticating the login request only.

According to further embodiments, the account detail sharing process may further comprise making a determination that the first device is trusted prior to enabling authorization of the login request by the first device. Various implementations herein may be configured such that the determination may include assessing a quantity of times that the first user device has been used to successfully log into the first user account to access the at least one online service.

Here, it is noted that the disclosed systems, platforms, methods, and computer-readable media include or involve an account detail sharing mechanism that may include and/or involve an online service application configured to perform various automated functionality set forth herein. Unlike conventional software and solutions, the present innovations may utilize an improved online service application that may, via one or both of hosting and/or accessing of user accounts as well as the provision and authenticating of login request notifications, be configured to share account details with a trusted party via secure and efficient computing technologies. In these and other manners, implementations involving the online service application empowered with disclosed account detail sharing mechanism represent an improvement over conventional account management granting access to user accounts, as well as over conventional account authentication attempting to secure the use thereof.

The disclosed mechanism of sharing account details improves utilization of both processing and communication resources, such as by generating and transmitting a login request notification including a GUI element based on information and processing performed an online service (or other) application, and by authenticating another user's login request via processing of a response based on the GUI element and information related to the shared users. Moreover, the improved online service enabled by the disclosed account sharing mechanisms improves security, efficiency, robustness, and autonomousness of the user account management and authentication; and reduces likelihood of user exposure to security risks involving with phishing of user accounts, as well as likelihood of service inaccessibility or "locked out time" caused by the misplacement of the correct login credentials, the unavailability of biometric data based login credentials, and/or entering of incorrect account login credentials, thereby reducing or eliminating the need for communicating account credentials in order to share account details/logins.

Figure 6:
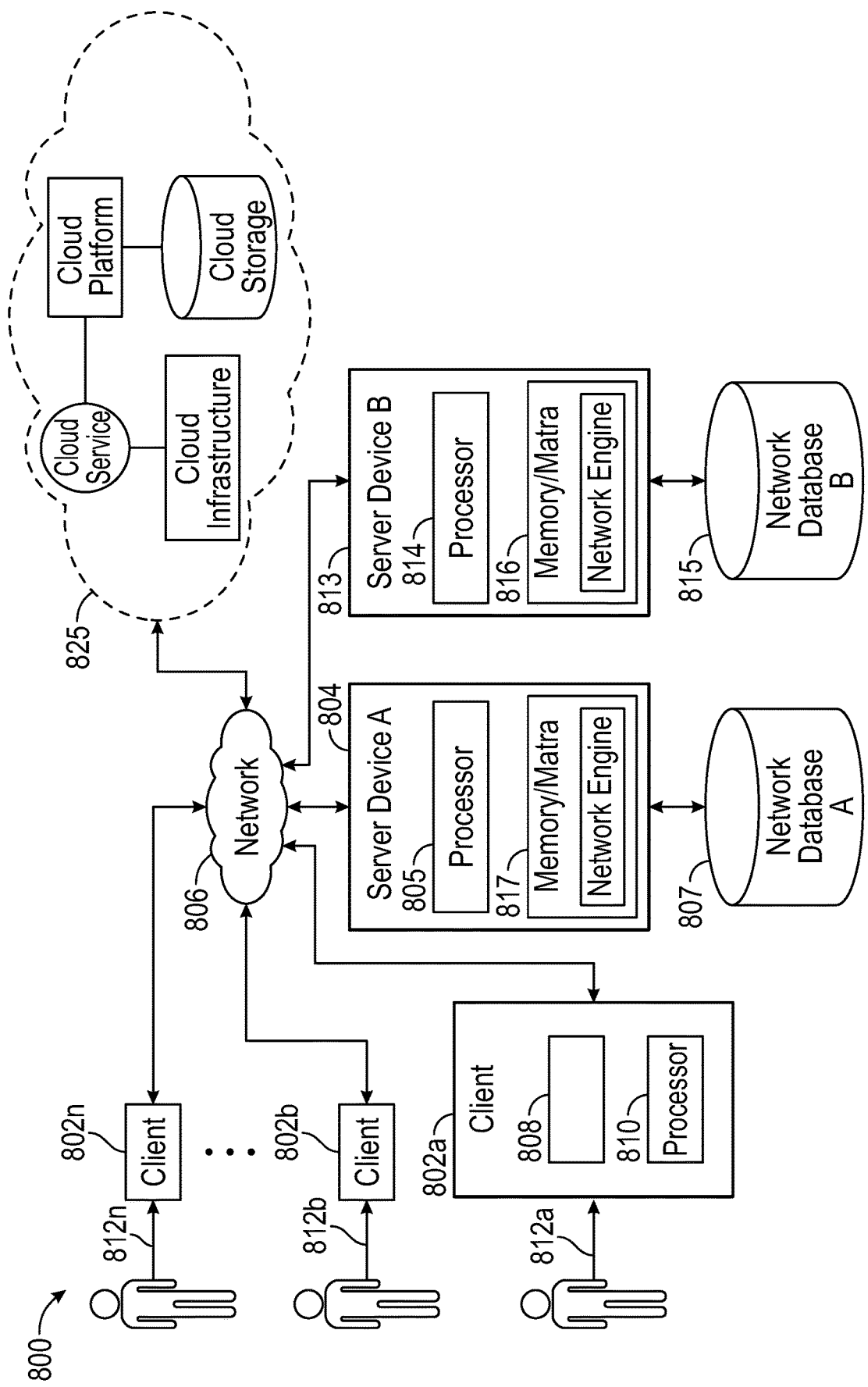
FIG. 6 is a block diagram depicting an exemplary computer-based system and/or platform, in accordance with one or more embodiments of the present disclosure.

FIG. 6 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 6, clients such as client devices 802a through 802n (e.g., POS devices and/or client computing devices, etc.) of the exemplary computer-based system/platform may include virtually any computing device capable of receiving and sending communications over a network (e.g., cloud network, etc.), such as network 806, to and from another computing device, such as servers 804 and 813, each other, and the like. In some embodiments, the member devices 802a through 802n may be POS (point of sale, point of service, etc.) devices, personal computers, multiprocessor systems, microprocessor-based or programmable consumer electronics, network PCs, and the like. In some embodiments, one or more devices within client devices 802a through 802n may include computing devices that typically connect via wired connection and/or wireless communications media such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more client devices of client devices 802a through 802n may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within client devices 802a through 802n may include may run one or more applications, such as Internet browsers, mobile applications, voice calls, video games, videoconferencing, and email, among others. In some embodiments, one or more member clients of client devices 802a through 802n may be configured to receive and to send web pages, and the like. In some embodiments, an exemplary specifically programmed browser applications, such as any associated with online transactions of the present disclosure, may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device of client devices 802a through 802n may be specifically programmed by either Java, .Net, QT, C, C++ and/or other suitable programming language. In some embodiments, one or more client devices within client devices 802a through 802n may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 806 may provide network access, data transport and/or other services to any computing device coupled to it. In some embodiments, the exemplary network 806 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 806 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 806 may include and implement, as an alternative or in conjunction with one or more of the above, a WiMAX architecture defined by the WiMAX forum. In some embodiments and, optionally, in combination of any embodiment described above or below, the exemplary network may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network may be transmitted based at least in part on one or more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network may also include mass storage, such as network attached storage (NAS), a storage area network (SAN), a content delivery network (CDN) or other forms of computer- or machine-readable media.

In some embodiments, one or both of the exemplary server 804 and/or the exemplary server 813 may be a web server (or a series of servers) running a network operating system, examples of which may include but are not limited to Microsoft Windows Server, Novell NetWare, or Linux. In some embodiments, the exemplary server 804 and/or the exemplary server 813 may be used for and/or provide cloud and/or network computing. Although not shown in FIG. 6, in some embodiments, the exemplary server 804 and/or the exemplary server 813 may have connections to external systems like email, SMS messaging, text messaging, ad content providers, etc. Any of the features of the exemplary server 804 may be also implemented in the exemplary server 813 and vice versa.

In some embodiments, one or more of the exemplary servers 804 and 813 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the client devices 802a through 802n.

In some embodiments and, optionally, in combination of any embodiment described above or below, for example, one or more exemplary client devices 802a through 802n, the exemplary server 804, and/or the exemplary server 813 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

In some embodiments, the member computing devices 802a, 802b through 802n shown each at least includes a computer-readable media 808, which may include memory such as random-access memory (RAM), coupled to a processor 810. In some embodiments, the processor 810 may execute computer-executable program instructions stored in media or memory, at 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client device 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™, Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 812n, may communicate over the exemplary network 806 with each other and/or with other systems and/or devices coupled to the network 806. As shown in FIG. 6, exemplary server devices 804, 813 and, in some embodiments, one or more cloud components 825 may be also coupled to the network 806. In some embodiments, one or more member computing devices 802a through 802n may be mobile clients.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
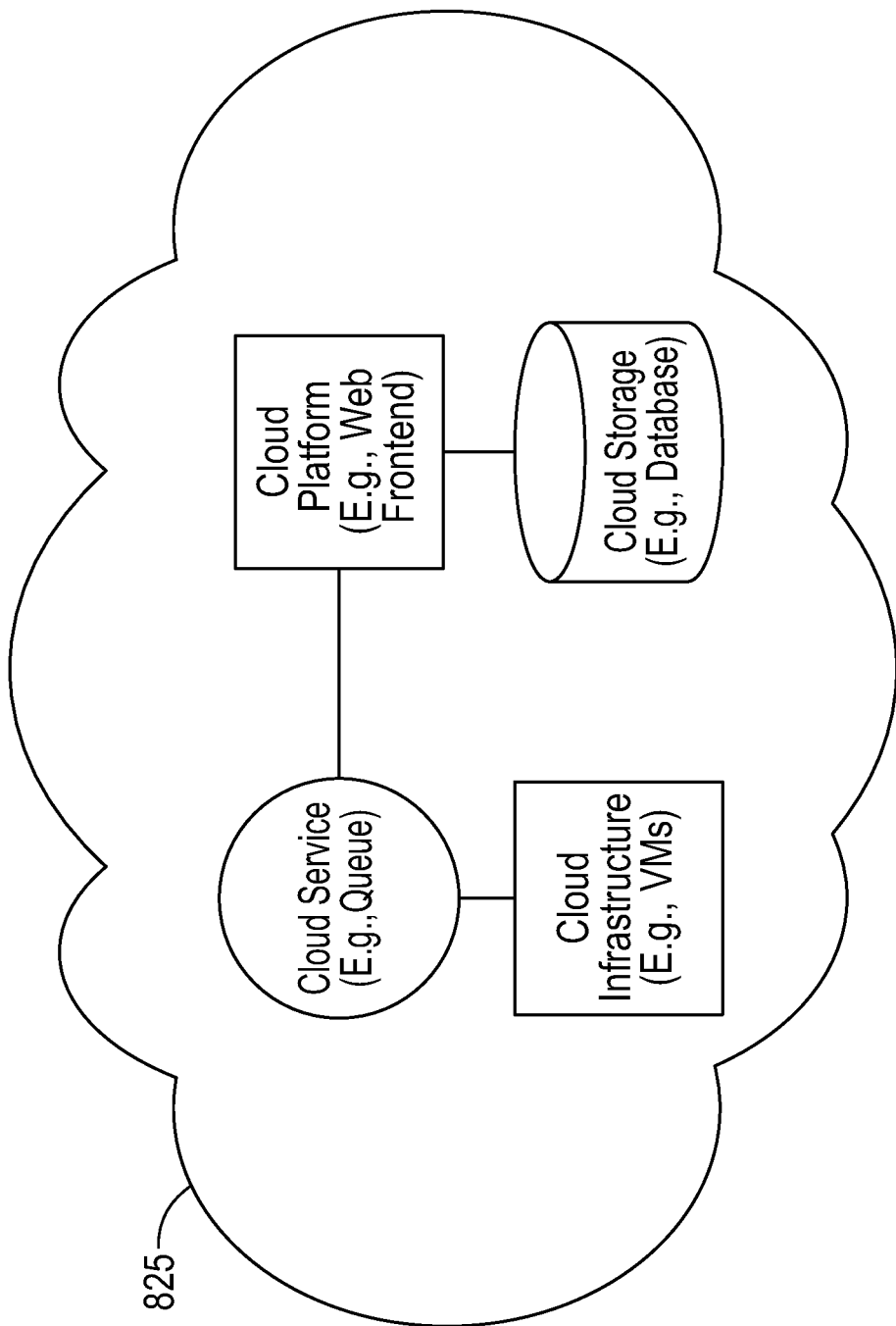
FIGS. 7 and 8 are diagrams illustrating two exemplary implementations of cloud computing architecture/aspects with respect to which the disclosed technology may be specifically configured to operate, in accordance with certain embodiments of the present disclosure.
Figure 8:
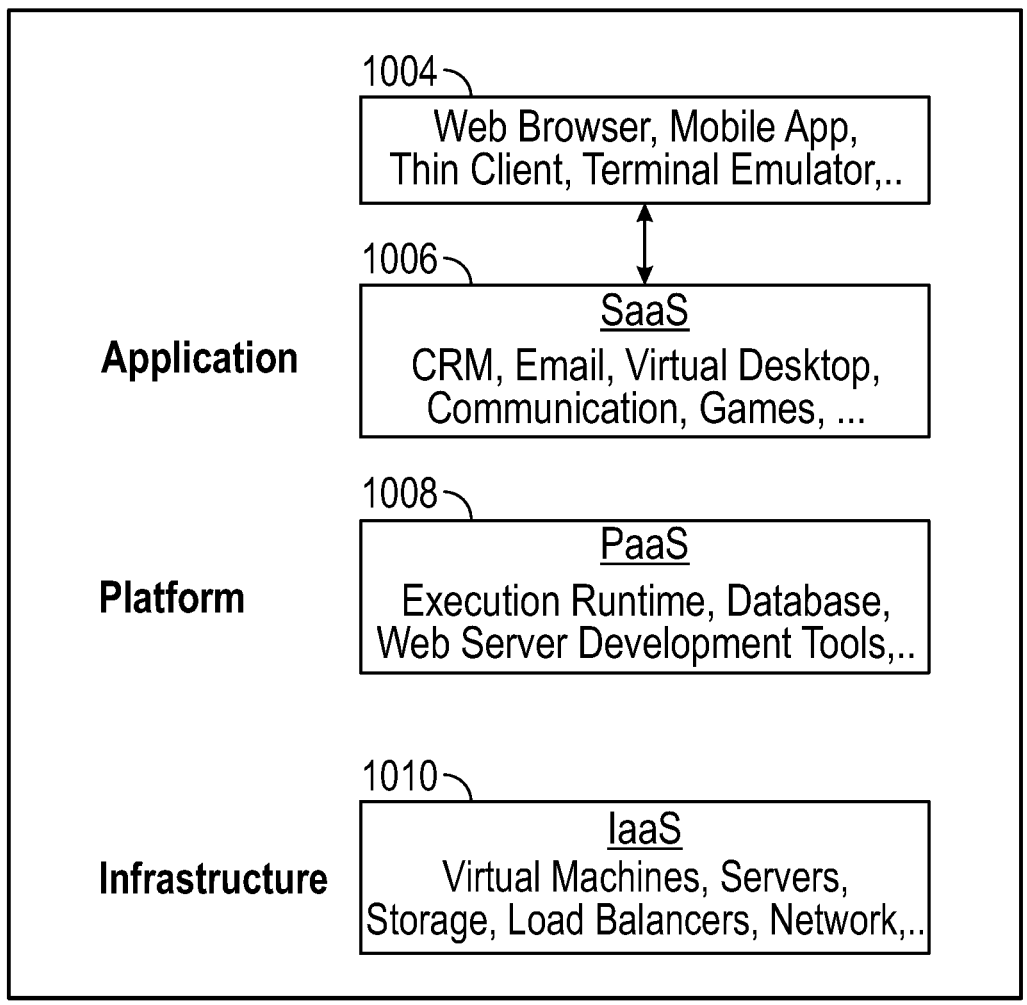

As also shown in FIGS. 7 and 8, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., related to the online service, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 8, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 7 and 8 illustrate diagrams of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the network communication aspects, e.g. as shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and the term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., as shown in FIGS. 6-8) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems of the present disclosure may be implemented across one or more of various computer platforms such as, but not limited to: (1) Linux, (2) Microsoft Windows, (3) OS X (Mac OS), (4) Solaris, (5) UNIX (6) VM, (7) Android, (8) Java Platforms, (9) Open Web Platform, or other suitable computer platforms.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation. In some embodiments, the exemplary inventive computer-based systems/platforms, exemplary inventive computer-based devices, and/or exemplary inventive computer-based components of the present disclosure may be configured to utilize a location of an unregistered trusted party as part of the authentication detailed herein.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A computer-implemented method comprising:
  hosting, by a server, at least one online service accessed by a plurality of users utilizing a plurality of user accounts, wherein each of the user accounts is configured for a plurality of concurrent authenticated access sessions by a plurality of devices;
  establishing, by the server, a first authenticated access session, associated with a first user account, between the at least one online service and a first device associated with a first user based on an authentication of the first user;
  receiving, by the server, a login request to establish, via the first user account, a second authenticated access session between the at least one online service and a second device associated with a second user, wherein the login request comprises a second device identification of the second device;
  transmitting, by the server, a login request notification of the login request, to the first device, to request the first user associated with the first device to authenticate the login request of the second user, wherein the login request notification comprises the second device identification of the second device and a graphical user interface (GUI) element configured to allow the first user of the first device to authenticate the login request;
  authenticating, by the server, the second user based on an interaction with the first user via the GUI element; and
  establishing, by the server, the second authenticated access session between the at least one online service and the second device associated with the second user based on the authentication of the second user.

Clause 2. The method of clause 1 or any clause herein, wherein the second device identification is not registered with the first user account.

Clause 3. The method of clause 1 or any clause herein, further comprising:
  upon authorization of the login request via the GUI element, transmitting, by the server, information to associate login credentials of the user of the first device with the second authenticated login session of the second device.

Clause 4. The method of clause 3 or any clause herein, wherein the login credentials comprise a one-time login credential for use in connection with authenticating the login request only.

Clause 5. The method of clause 1 or any clause herein, wherein the login request notification is transmitted via the at least one online service.

Clause 6. The method of clause 1 or any clause herein, wherein selection/operation of the GUI element to authorize the login request includes providing verification, by the user of the first device, that the second device is associated with a trusted entity.

Clause 7. The method of clause 1 or any clause herein, wherein the login request notification, from the server to the first device advising the user of the first device that another user is attempting to log into the first user account, is transmitted upon submission, by a user of the second device, of one or both an incorrect username and an incorrect password.

Clause 8. The method of clause 1 or any clause herein, further comprising:
  making a determination that the first device is trusted prior to enabling authorization of the login request by the first device.

Clause 9. The method of clause 8 or any clause herein, wherein the determination includes assessing a quantity of times that the first user device has been used to successfully log into the first user account to access the at least one online service.

Clause 10. The method of clause 1 or any clause herein, wherein access to the first user account and the at least one online service, by the second device, is conditioned upon continued login of the first device with the first user account.

Clause 11. The method of clause 10 or any clause herein, further comprising:
  upon ending a login session of the first device with the first user account, providing the first device with a GUI option to continue allowing the second device to the first user account or to terminate access.

Clause 12. The method of clause 1 or any clause herein, further comprising:
  registering, by the server, a first device identification for the first device with the first user account.

Clause 13. The method of clause 1 or any clause herein, further comprising:

registering, by the server, after the authenticating the second user, the second device identification for the second device with the first user account.

Clause 14. A computer-implemented method comprising:

hosting, by a server, at least one online service accessed by a plurality of users utilizing a plurality of user accounts, wherein each of the user accounts is configured for a plurality of concurrent authenticated access sessions by a plurality of devices;

establishing, by the server, a first authenticated access session, via a first user account, between the at least one online service and a first device associated with a first user based on an authentication of the first user;

registering, by the server, a first device identification for the first device with the first user account;

receiving, by the server, during or after the first authenticated access session, a login request to establish, via the first user account, a second authenticated access session between the at least one online service and a second device associated with a second user, wherein the login request comprises a second device identification of the second device;

wherein the second device identification is not registered with the first user account;

transmitting, by the server, a login request notification of the login request, to the first device, to request the first user associated with the first device to authenticate the login request of the second user, wherein the login request notification comprises the second device identification of the second device and a graphical user interface (GUI) element configured to allow the first user of the first device to authenticate the login request;

authenticating, by the server, the second user based on an interaction with the first user via the GUI element;

registering, by the server, after the authenticating the second user, the second device identification for the second device with the first user account; and establishing, by the server, the second authenticated access session between the at least one online service and the second device associated with the second user based on a registration of the second device identification of the second device with the first user account.

Clause 15. The method of clause 14 or any clause herein, further comprising:

upon authorization of the login request via the GUI element, transmitting, by the server, information to associate login credentials of the user of the first device with the second authenticated login session of the second device.

Clause 16. The method of clause 15 or any clause herein, wherein the login credentials comprise a one-time login credential for use in connection with authenticating the login request only.

Clause 17. The method of clause 14 or any clause herein, wherein selection/operation of the GUI element to authorize the login request includes providing verification, by the user of the first device, that the second device is associated with a trusted entity.

Clause 18. The method of clause 14 or any clause herein, wherein the login request notification, from the server to the first device advising the user of the first device that another user is attempting to log into the first user account, is transmitted upon submission, by a user of the second device, of one or both an incorrect username and an incorrect password.

Clause 19. The method of clause 14 or any clause herein, further comprising:

making a determination that the first device is trusted prior to enabling authorization of the login request by the first device;

wherein the determination includes assessing a quantity of times that the first user device has been used to successfully log into the first user account to access the at least one online service.

Clause 20. A computer-implemented method comprising:

hosting, by a server, at least one online service accessed by a plurality of users utilizing a plurality of user accounts, wherein each of the user accounts is configured for a plurality of concurrent authenticated access sessions by a plurality of devices;

registering, by the server, for each of the plurality of user accounts, a set of one or more device identifications, each of the device identifications identifying a device associated with a prior authenticated access sessions for each respective user account;

establishing, by the server, a first authenticated access session, via a first user account, between the at least one online service and a first device associated with a first user based on an authentication of the first user;

receiving, by the server, during the first authenticated access session, a login request to establish, via the first user account, a second authenticated access session between the at least one online service and a second device associated with a second user attempting to access the first user account from the second device, wherein the login request comprises a second device identification of the second device;

determining, by the server, that the device identification of the second device corresponds to the set of one or more device identifications registered, by the server, associated with the prior authenticated access sessions;

transmitting, by the server, a login request notification of the login request, to the first device, to request the first user associated with the first device to authenticate the login request of the second user, wherein the login request notification comprises the second device identification of the second device and a graphical user interface (GUI) element configured to allow the first user of the first device to authenticate the login request;

authenticating, by the server, the second user based on an interaction with the first user via the GUI element; and establishing, by the server, the second authenticated access session between the at least one online service and the second device associated with the second user based on the authentication provided via the GUI element.

Clause 21. Embodiments herein may also take the form of a system comprised of computing elements that are arranged, coupled, configured, programmed and/or otherwise adapted to perform the features and functionality set forth anywhere in the present disclosure.

Clause 22. In addition, embodiments herein may also take the form of one or more computer readable media containing computer-executable instructions for performing any of the processing herein, the computer-executable instructions being executable via one or more processing components to process instructions regarding and/or otherwise perform one or more aspects of the functionality set forth herein.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method comprising:
   hosting, by a server, at least one online service accessed by a plurality of users utilizing a plurality of user accounts, wherein each of the user accounts is configured for a plurality of concurrent authenticated access sessions by a plurality of devices;
   establishing, by the server, a first authenticated access session, associated with a first user account, between the at least one online service and a first device associated with a first user based on an authentication of the first user;
   receiving, by the server, a login request to establish, via the first user account, a second authenticated access session between the at least one online service and a second device associated with a second user, wherein the login request comprises a second device identification of the second device;
   transmitting, by the server, a login request notification of the login request, to the first device, to request the first user associated with the first device to authenticate the login request of the second user, wherein the login request notification comprises the second device identification of the second device and a graphical user interface (GUI) element configured to allow the first user of the first device to authenticate the login request;
   authenticating, by the server, the second user based on an interaction with the first user via the GUI element;
   establishing, by the server, the second authenticated access session between the at least one online service and the second device associated with the second user based on the authentication of the second user; and
   executing, by the server, a process to maintain access to the second authenticated session between the at least one online service and the second device, the process comprising:
   (i) determining when continued login of the first device with the first user account remains active and when the continued login expires;
   (ii) while the continued access of the first device with the first user account is determined as remaining active, maintaining the access to the second authenticated session by the second device; and
   (iii) when the continued access of the first device with the first user account is determined to expire:
      providing the first device with a GUI option to continue allowing the second device access to the first user account; and
      upon approval of the GUI option via the first device, maintaining the access, by the second device, to the second authenticated session.

2. The method of claim 1, wherein the second device identification is not registered with the first user account.

3. The method of claim 1, further comprising:
   upon authorization of the login request via the GUI element, transmitting, by the server, information to associate login credentials of the user of the first device with the second authenticated login session of the second device.

4. The method of claim 3, wherein the login credentials comprise a one-time login credential for use in connection with authenticating the login request only.

5. The method of claim 1, wherein the login request notification is transmitted via the at least one online service.

6. The method of claim 1, wherein selection or operation of the GUI element to authorize the login request includes providing verification, by the user of the first device, that the second device is associated with a trusted entity.

7. The method of claim 1, wherein the login request notification, from the server to the first device advising the user of the first device that another user is attempting to log into the first user account, is transmitted upon submission, by a user of the second device, of one or both an incorrect username and an incorrect password.

8. The method of claim 1, further comprising:
   making a determination that the first device is trusted prior to enabling authorization of the login request by the first device.

9. The method of claim 8, wherein the determination includes assessing a quantity of times that the first user device has been used to successfully log into the first user account to access the at least one online service.

10. The method of claim 1, further comprising:
    registering, by the server, a first device identification for the first device with the first user account.

11. The method of claim 1 further comprising:
    registering, by the server, after the authenticating the second user, the second device identification for the second device with the first user account.

12. A computer-implemented method comprising:
    hosting, by a server, at least one online service accessed by a plurality of users utilizing a plurality of user accounts, wherein each of the user accounts is configured for a plurality of concurrent authenticated access sessions by a plurality of devices;
    establishing, by the server, a first authenticated access session, via a first user account, between the at least one online service and a first device associated with a first user based on an authentication of the first user;
    registering, by the server, a first device identification for the first device with the first user account;
    receiving, by the server, during or after the first authenticated access session, a login request to establish, via the first user account, a second authenticated access session between the at least one online service and a second device associated with a second user, wherein the login request comprises a second device identification of the second device;
    wherein the second device identification is not registered with the first user account;
    transmitting, by the server, a login request notification of the login request, to the first device, to request the first user associated with the first device to authenticate the login request of the second user, wherein the login request notification comprises the second device identification of the second device and a graphical user interface (GUI) element configured to allow the first user of the first device to authenticate the login request;
    authenticating, by the server, the second user based on an interaction with the first user via the GUI element;
    registering, by the server, after the authenticating the second user, the second device identification for the second device with the first user account;
    establishing, by the server, the second authenticated access session between the at least one online service and the second device associated with the second user based on a registration of the second device identification of the second device with the first user account; and executing, by the server, a process to maintain access to the second authenticated session by the second device, the process comprising:
  (i) determining when continued login of the first device with the first user account remains active and when the continued login expires;
  (ii) while the continued access of the first device with the first user account is determined as remaining active, maintaining the access to the second authenticated session by the second device; and
  (iii) when the continued access of the first device with the first user account is determined to expire:
    providing the first device with a GUI option to continue allowing the second device access to the first user account; and
    upon approval of the GUI option via the first device, maintaining the access, by the second device, to the second authenticated session.

13. The method of claim 12, further comprising:
upon authorization of the login request via the GUI element, transmitting, by the server, information to associate login credentials of the user of the first device with the second authenticated login session of the second device.

14. The method of claim 13, wherein the login credentials comprise a one-time login credential for use in connection with authenticating the login request only.

15. The method of claim 12, wherein selection or operation of the GUI element to authorize the login request includes providing verification, by the user of the first device, that the second device is associated with a trusted entity.

16. The method of claim 12, wherein the login request notification, from the server to the first device advising the user of the first device that another user is attempting to log into the first user account, is transmitted upon submission, by a user of the second device, of one or both an incorrect username and an incorrect password.

17. The method of claim 12, further comprising:
making a determination that the first device is trusted prior to enabling authorization of the login request by the first device;
wherein the determination includes assessing a quantity of times that the first user device has been used to successfully log into the first user account to access the at least one online service.

18. A computer-implemented method comprising:
hosting, by a server, at least one online service accessed by a plurality of users utilizing a plurality of user accounts, wherein each of the user accounts is configured for a plurality of concurrent authenticated access sessions by a plurality of devices;
registering, by the server, for each of the plurality of user accounts, a set of one or more device identifications, each of the device identifications identifying a device associated with a prior authenticated access sessions for each respective user account;
establishing, by the server, a first authenticated access session, via a first user account, between the at least one online service and a first device associated with a first user based on an authentication of the first user;
receiving, by the server, during the first authenticated access session, a login request to establish, via the first user account, a second authenticated access session between the at least one online service and a second device associated with a second user attempting to access the first user account from the second device, wherein the login request comprises a second device identification of the second device;
determining, by the server, that the device identification of the second device corresponds to the set of one or more device identifications registered, by the server, associated with the prior authenticated access sessions;
transmitting, by the server, a login request notification of the login request, to the first device, to request the first user associated with the first device to authenticate the login request of the second user, wherein the login request notification comprises the second device identification of the second device and a graphical user interface (GUI) element configured to allow the first user of the first device to authenticate the login request;
authenticating, by the server, the second user based on an interaction with the first user via the GUI element;
registering, by the server, after the authenticating the second user, the second device identification for the second device with the first user account;
establishing, by the server, the second authenticated access session between the at least one online service and the second device associated with the second user based on the authentication provided via the GUI element; and
executing a process to maintain access to the first user account and the at least one online service, by the second device, the process comprising:
  (i) determining when continued login of the first device with the first user account remains active and when the continued login ends;
  (ii) while the continued access of the first device with the first user account is determined as remaining active, maintaining the access by the second device; and
  (iii) when the continued access of the first device with the first user account is determined to end:
    providing the first device with a GUI option to continue allowing the second device access to the first user account; and
    upon approval of the GUI option via the first device, maintaining the access by the second device.

19. The method of claim 18, wherein selection or operation of the GUI element to authorize the login request includes providing verification, by the user of the first device, that the second device is associated with a trusted entity.

20. The method of claim 18, further comprising:
making a determination that the first device is trusted prior to enabling authorization of the login request by the first device;
wherein the determination includes assessing a quantity of times that the first user device has been used to successfully log into the first user account to access the at least one online service.

* * * * *